US012723528B2

(12) United States Patent
Kim et al.

(10) Patent No.: US 12,723,528 B2
(45) Date of Patent: Sep. 1, 2026

(54) SYSTEMS INCLUDING A HYDROGEN INTERNAL COMBUSTION ENGINE AND AFTERTREATMENT SYSTEM

(71) Applicant: CUMMINS EMISSION SOLUTIONS INC., Columbus, IN (US)

(72) Inventors: Mi-Young Kim, Columbus, IN (US); Dylan Scott Trandal, Columbus, IN (US); Bijesh M. Shakya, Columbus, IN (US); Krishna Kamasamudram, Columbus, IN (US); Arvind Suresh, Columbus, IN (US); Lai Wei, Columbus, IN (US); Laura Anne Benson, Mason, OH (US); Chelsea Kelsey Barrera, Coeur d'Alene, ID (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days.

(21) Appl. No.: 19/240,770

(22) Filed: Jun. 17, 2025

(65) Prior Publication Data

US 2025/0305431 A1 Oct. 2, 2025

Related U.S. Application Data

(63) Continuation of application No. PCT/US2023/085361, filed on Dec. 21, 2023.

(Continued)

(51) Int. Cl.

| | |
|---|---|
| ***F01N 3/08*** | (2006.01) |
| ***F01N 3/20*** | (2006.01) |
| ***F02D 1/02*** | (2006.01) |

(52) U.S. Cl.

CPC ......... *F01N 3/0885* (2013.01); *F01N 3/0842* (2013.01); *F01N 3/2006* (2013.01);

(Continued)

(58) Field of Classification Search

CPC .... F01N 3/0885; F01N 3/0842; F01N 3/2006; F01N 2610/04; F02D 1/02; F02D 2200/08; F02D 2250/36

See application file for complete search history.

(56) References Cited

U.S. PATENT DOCUMENTS

| | | | | |
|---|---|---|---|---|
| 6,427,639 | B1 * | 8/2002 | Andrews | F01N 3/206 123/3 |
| 6,826,906 | B2 | 12/2004 | Kakwani et al. | |

(Continued)

FOREIGN PATENT DOCUMENTS

| | | | | |
|---|---|---|---|---|
| DE | 10 2020 209 156 A1 | | 1/2022 | |
| DE | 102020209152 A1 | * | 1/2022 | F01N 3/2066 |
| WO | WO-2013165302 A1 | * | 11/2013 | F01N 3/103 |

OTHER PUBLICATIONS

Cummins Aftertreatment System. [online]. [retrieved on Nov. 30, 2022]. Retrieved from the Internet: <URL:https://cdn.vehicleservicepros.com/files/base/cygnus/vspc/image/2011/05/960w/cummins_aftertreatment_system__10270876.jpg>.

(Continued)

*Primary Examiner* — Matthew T Largi

(74) *Attorney, Agent, or Firm* — Foley & Lardner LLP

(57) ABSTRACT

A system includes: a hydrogen internal combustion engine configured to produce exhaust; an aftertreatment system in exhaust receiving communication with the hydrogen internal combustion engine, the aftertreatment system comprising a catalyst member; a sensor coupled to the aftertreatment system; and a controller configured to: receive, from the sensor, data corresponding to a characteristic of the aftertreatment system, determine, based on the characteristic, a performance value corresponding to the catalyst member, compare the performance value to a threshold, cause the hydrogen internal combustion engine to operate in a first engine operating mode when the performance value does not (Continued)

exceed the threshold, and cause the hydrogen internal combustion engine to operate in a second engine operating mode when the performance value exceeds the threshold.

20 Claims, 9 Drawing Sheets

Related U.S. Application Data

(60) Provisional application No. 63/434,878, filed on Dec. 22, 2022.

(52) U.S. Cl.
CPC ............ *F02D 1/02* (2013.01); *F01N 2610/04* (2013.01); *F02D 2200/08* (2013.01); *F02D 2250/36* (2013.01)

(56) References Cited

U.S. PATENT DOCUMENTS

| | | | | |
|---|---|---|---|---|
| 9,080,524 | B2* | 7/2015 | Yezerets | B01J 38/06 |
| 9,657,665 | B2 | 5/2017 | Yezerets et al. | |
| 9,677,440 | B2 | 6/2017 | Fischer et al. | |
| 11,125,133 | B2 | 9/2021 | Sung et al. | |
| 11,268,420 | B2 | 3/2022 | Voss et al. | |
| 11,608,765 | B2* | 3/2023 | Magnusson | F02D 41/024 |
| 2003/0115860 | A1 | 6/2003 | May et al. | |
| 2006/0248876 | A1* | 11/2006 | Taxon | B01D 53/9409 60/275 |
| 2008/0202097 | A1* | 8/2008 | Driscoll | B01D 53/9495 60/274 |
| 2010/0024390 | A1* | 2/2010 | Wills | F01N 3/106 60/287 |
| 2010/0077739 | A1 | 4/2010 | Rodman et al. | |
| 2010/0326051 | A1 | 12/2010 | Busch et al. | |
| 2017/0204762 | A1 | 7/2017 | Kotrba et al. | |
| 2018/0045097 | A1 | 2/2018 | Tang et al. | |
| 2018/0071681 | A1* | 3/2018 | Miller | F01N 3/023 |
| 2022/0260040 | A1 | 8/2022 | Malischewski et al. | |

OTHER PUBLICATIONS

M. Sens, et al, Hydrogen Powertrains in Competition to Fossil Fuel Based Internal Combustion Engines and Battery Electric Powertrains, 42nd International Vienna Motor Symposium Apr. 29, 2021.
R. Dreisbach, et al, The Heavy-Duty Hydrogen Engine and its Realization until 2025, 42nd International Vienna Motor Symposium Apr. 29, 2021.
Dmitry A. Svintsitskiy, et. al., Insight into the Nature of Active Species of Pt/Al2O3 Catalysts for low Temperature NH3 Oxidation, ChemCatChem Sep. 11, 2019.
A. Kufferath, et al, H2 Ice Powertrains for Future On-Road Mobility, 42nd International Vienna Motor Symposium Apr. 29, 2021.
JM Technology Update—T Panel, Johnson Matthey, Mar. 10, 2022.
Cummins to Reveal Zero-Carbon H2-ICE Concept Truck at IAA Expo Powered by the B6.7H Hydrogen Engine. [online]. [retrieved on Sep. 15, 2022]. Retrieved from the Internet: <URL:https://www.cummins.com/news/releases/2022/09/13/cummins-reveal-zero-carbon-h2-ice-concept-truck-iaa-expo-powered-b67h?utm_source=linkedin&utm_medium=social&utm_campaign=eng-onhwy-awareness&utm_content=cummins-reveal-zero-carbon-h2-ice-concept-truck-iaa-expo-powered-b67h>.
International Search Report and Written Opinion in PCT/US2023/085361 issued Mar. 15, 2024.

* cited by examiner

SYSTEMS INCLUDING A HYDROGEN INTERNAL COMBUSTION ENGINE AND AFTERTREATMENT SYSTEM

CROSS-REFERENCE RELATED APPLICATION

This Application is a continuation of PCT Application No. PCT/US2023/085361, filed Dec. 21, 2023, which claims the benefit of and priority to U.S. Provisional Patent Application No. 63/434,878, filed Dec. 22, 2022. The contents of these disclosures are hereby incorporated by reference herein.

TECHNICAL FIELD

The present disclosure relates generally to a system that includes a hydrogen internal combustion engine and an aftertreatment system.

BACKGROUND

It may be desirable to treat exhaust produced by a combustion of hydrogen fuel by the hydrogen internal combustion engine. Unlike internal combustion engines that burn carbonaceous fuel, such as diesel fuel or gasoline, the exhaust produced by a hydrogen internal combustion engine may not include hydrocarbons or carbon oxides (e.g., carbon monoxide or carbon dioxide). Instead, the exhaust may include sulfur oxides ($SO_x$) originating from burning lubricants and/or nitrogen oxides ($NO_x$) originating from burning the hydrogen fuel (e.g., due to it being burned in the presence of air). The exhaust can be treated using an aftertreatment system.

SUMMARY

In one embodiment, a system includes a hydrogen internal combustion engine, an aftertreatment system, a sensor, and a controller. The hydrogen internal combustion engine is configured to produce exhaust. The aftertreatment system is in exhaust receiving communication with the hydrogen internal combustion engine. The aftertreatment system includes a catalyst member. The sensor is coupled to the aftertreatment system. The controller is configured to receive, from the sensor, data corresponding to a characteristic of the aftertreatment system; determine, based on the characteristic, a performance value corresponding to the catalyst member; compare the performance value to a threshold; cause the hydrogen internal combustion engine to operate in a first engine operating mode when the performance value does not exceed the threshold, the first engine operating mode causing the hydrogen internal combustion engine to output a first amount of hydrogen in the exhaust; and cause the hydrogen internal combustion engine to operate in a second engine operating mode when the performance value exceeds the threshold, the second engine operating mode causing the hydrogen internal combustion engine to output a second amount of hydrogen in the exhaust, the second amount greater than the first amount.

In one embodiment, a system includes a hydrogen internal combustion engine, an aftertreatment system, a sensor, and a controller. The hydrogen internal combustion engine is configured to produce exhaust. The aftertreatment system is in exhaust receiving communication with the hydrogen internal combustion engine. The aftertreatment system includes a catalyst member. The sensor is coupled to the aftertreatment system. The controller is configured to receive, from the sensor, sensor data corresponding to a characteristic of the aftertreatment system; determine, based on the sensor data, an ammonia value associated with the aftertreatment system; compare the ammonia value to a threshold; cause the hydrogen internal combustion engine to operate in a first engine operating mode when the ammonia value does not exceed the threshold, the first engine operating mode causing the hydrogen internal combustion engine to output a first amount of hydrogen in the exhaust; cause the hydrogen internal combustion engine to operate in a second engine operating mode when the ammonia value exceeds the threshold, the second engine operating mode causing the hydrogen internal combustion engine to output a second amount of hydrogen in the exhaust, the second amount greater than the first amount.

In one embodiment, a method of regenerating a catalyst member of an aftertreatment system includes receiving, by a controller, vehicle data comprising a sulfur amount, a time duration, a number of miles, an exhaust temperature, a catalyst activity check, and/or a hydrogen amount; estimating, by the controller, a sulfur amount on the catalyst member based on the vehicle data; causing a hydrogen internal combustion engine to operate in a first engine operating mode when the sulfur amount does not exceed the threshold, the first engine operating mode causing the hydrogen internal combustion engine to output a first amount of hydrogen in the exhaust; causing the hydrogen internal combustion engine to operate in a second engine operating mode when the sulfur amount exceeds the threshold, the second engine operating mode causing the hydrogen internal combustion engine to output a second amount of hydrogen, the second amount greater than the first amount.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

Figure 1:
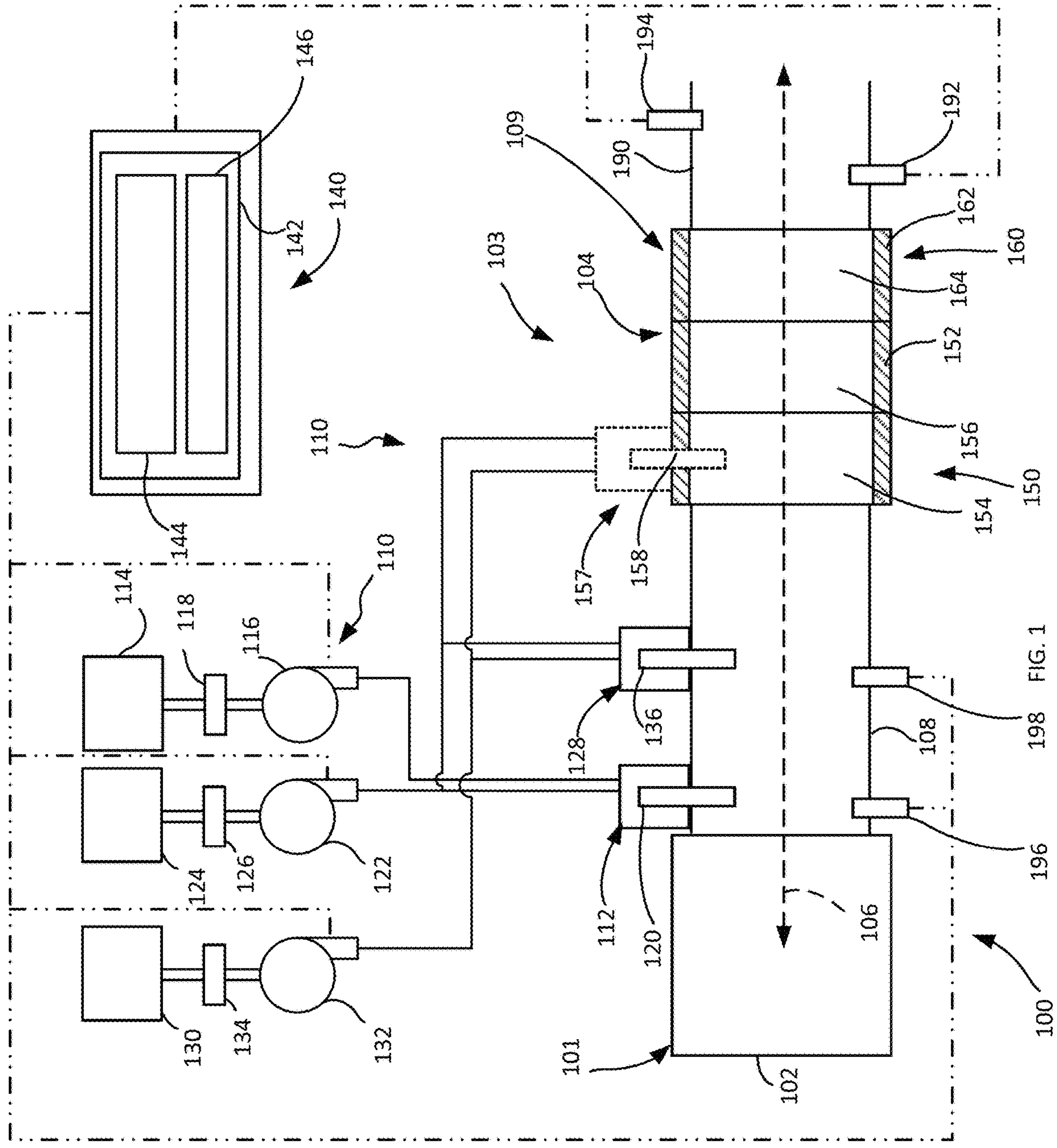
FIG. 1 is a schematic diagram of a system that includes a hydrogen internal combustion engine and an aftertreatment system.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for treating exhaust of a hydrogen internal combustion engine with an exhaust aftertreatment system (or simply "aftertreatment system"). The various concepts introduced above and discussed in greater detail below may be implemented in any of a number of ways, as the described concepts are not limited to any particular manner of implementation. Examples of specific implementations and applications are provided primarily for illustrative purposes.

I. OVERVIEW

In a system that includes a hydrogen internal combustion engine (H2-ICE), exhaust produced by the H2-ICE may include species such as sulfur oxides ($SO_x$) originating from lubricants. The presence of $SO_x$ in the exhaust may decrease the performance of various aftertreatment catalyst members, such as a selective catalytic reduction (SCR) catalyst member and/or an ammonia slip catalyst (ASC). For example, $SO_x$ strongly bind to active sites in the catalyst members. As more $SO_x$ binds to the catalyst members, the effectiveness of the catalyst members may decrease. For example, if $SO_x$ binds to a SCR catalyst member, the SCR catalyst member may not be able to reduce nitrogen oxides ($NO_x$) as effectively and/or if $SO_x$ binds to an ASC, the ASC may not be able to convert ammonia into nitrogen gas ($N_2$) and water ($H_2O$). Removing $SO_x$ from a catalyst member or "regenerating" a SCR catalyst member may enable the SCR catalyst member to more effectively reduce nitrogen oxides ($NO_x$). Similarly, removing $SO_x$ from a catalyst member or "regenerating" an ASC member may enable the ASC member to convert ammonia into N2 and H2O more effectively. The process of regenerating a catalyst member is referred to herein as "sulfur regeneration" and/or "de$SO_x$." In order to regenerate the catalyst members, the temperature of the catalyst members may be increased to greater than 500° C. to cause the $SO_x$ to "desorb" or separate the $SO_x$ from the catalyst members, thereby recovering lost performance. In some embodiments, an engine, such as an internal combustion engine, may change operating modes to output exhaust at a higher temperature such that exhaust conditions reach temperatures greater than 500° C. However, this requires excess fuel to be burned and may decrease the durability of the aftertreatment system.

Exhaust produced by the H2-ICE may include $NO_x$ originating from combusting $H_2$ in the presence of air. A reductant, such as urea, may be injected into the aftertreatment. The urea may be decomposed and hydrolyzed to generate ammonia ($NH_3$). The produced $NH_3$ is used to reduce $NO_x$ at the SCR catalyst member.

In some embodiments, it may be desirable to control an ammonia to $NO_x$ ratio (ANR) in the aftertreatment to a predefined, stoichiometric value to avoid $NH_3$ from "slipping" or exiting the aftertreatment system at the tailpipe. In some embodiments, it may be desirable to control the ANR to be greater than the stoichiometric value to account for $NH_3$ storage on a catalyst member, non-uniform $NH_3$ distribution within the aftertreatment system, the exhaust flow rate through the aftertreatment system, a $NO_x$ concentration and/or a $NO_2/NO_x$ ratio. Excess $NH_3$ may ultimately slip into components downstream of the SCR catalyst member.

Undesired slip of $NH_3$ from a catalyst member into an ASC may result from a variety of conditions or events including temperature transients, $NO_x$ concentration transients, and/or excessive urea dosing. Temperature transients and/or $NO_x$ transients in the exhaust aftertreatment system may occur when engine load changes. For example, as engine load increases, the temperature of the exhaust and/or $NO_x$ concentration in the exhaust may increase.

At least a portion of the $NH_3$ provided to the SCR catalyst member by the urea dosing system may be stored in the SCR catalyst member. This characteristic of $NH_3$ storage is desirable to achieve high NOx conversion efficiency. However, the quantity of $NH_3$ that the SCR catalyst member can store is a function of the catalyst temperature.

The ASC can be used to convert $NH_3$ into $N_2$ and $H_2O$. The process of converting ammonia that has slipped into the ASC is referred to herein as "ammonia slip control". The ammonia slip control process typically needs in excess of 275° C. to achieve high conversion efficiency.

As will be described herein, the presence of hydrogen ($H_2$) in the exhaust may lower the temperature required for de$SO_x$. Additionally and/or alternatively, the presence of $H_2$ in the exhaust may lower the temperature required for ammonia slip control. In some embodiments, $H_2$ may be introduced to the exhaust by dosing $H_2$ into the exhaust. In some embodiments, $H_2$ may be introduced to the exhaust by allowing $H_2$ to escape from the H2-ICE without combusting the $H_2$. In some embodiments, $H_2$ may be introduced to the exhaust by both allowing $H_2$ to escape from the H2-ICE without combusting the $H_2$ and dosing $H_2$ into the exhaust.

Implementations herein are directed to various aftertreatment system architectures that take advantage of increased $H_2$ in the exhaust to enable lower temperatures for de$SO_x$ and/or ammonia slip control. In some embodiments, the aftertreatment system may include a hydrogen dosing system for actively dosing $H_2$ into the aftertreatment system. The position and/or number of hydrogen dosing modules may vary in different aftertreatment system architectures. In some embodiments, a controller, such as an engine control unit (ECU) or engine control module (ECM), may cause the H2-ICE to operate in a different engine operating mode that causes the H2-ICE to output an increased amount of hydrogen in the exhaust. In any of the above described embodiments, increasing the amount of hydrogen in the exhaust may reduce the temperatures for de$SO_x$ and/or ammonia slip control.

II. OVERVIEW OF AFTERTREATMENT SYSTEM

FIGS. 1-5 depict various architectures of a system 100 (e.g., a vehicle system, a genset system, power system, etc.) that includes a hydrogen internal combustion engine system 101 (e.g., hydrogen engine system, etc.) and an aftertreatment system 103 (e.g., treatment system, etc.). The hydrogen internal combustion engine system 101 includes a hydrogen internal combustion engine (H2-ICE) 102. In some embodiments, the internal combustion engine system 101 includes a turbocharger (not shown). The aftertreatment system 103 is configured to treat exhaust produced by the hydrogen internal combustion engine 102. As is explained in more detail herein, the treatment may facilitate reduction of emission of undesirable components (e.g., nitrogen oxides ($NO_x$), sulfur oxide ($SO_x$), etc.) in the exhaust.

Referring first to FIG. 1, the system 100 is shown according to one embodiment. The aftertreatment system 103 includes an exhaust conduit system 104 (e.g., line system, pipe system, etc.). The exhaust conduit system 104 is configured to facilitate routing of the exhaust produced by the hydrogen internal combustion engine 102 throughout the aftertreatment system 103 and to atmosphere (e.g., ambient environment, etc.). At least a portion (e.g., segments of, conduits of, etc.) the exhaust conduit system 104 is centered on a conduit axis 106 (e.g., the conduit axis 106 extends through a center point of a conduit of the exhaust conduit system 104, etc.). As used herein, the term "axis" describes a theoretical line extending through the centroid (e.g., center of mass, geometric center, etc.) of an object. The object is centered on the axis. The object is not necessarily cylindrical (e.g., a non-cylindrical shape may be centered on an axis, etc.).

The exhaust conduit system 104 includes an intake chamber 108 (e.g., line, pipe, conduit, etc.). The intake chamber 108 is configured to receive exhaust from the hydrogen internal combustion engine 102. The intake chamber 108 may receive exhaust from a portion of the hydrogen internal combustion engine 102 (e.g., header on the hydrogen internal combustion engine, exhaust manifold on the hydrogen internal combustion engine, the hydrogen internal combustion engine, etc.). In some embodiments, the intake chamber 108 is coupled (e.g., attached, fixed, welded, fastened, riveted, adhesively attached, bonded, pinned, press-fit, etc.) to the hydrogen internal combustion engine 102. In other embodiments, the intake chamber 108 is integrally formed with the hydrogen internal combustion engine 102. As utilized herein, two or more elements are "integrally formed" with each when the two or more elements are formed and joined together as part of a single manufacturing process to create a single-piece or unitary construction that cannot be disassembled without an at least partial destruction of the overall component. The intake chamber 108 may be centered on the conduit axis 106 (e.g., the conduit axis 106 extends through a center point of the intake chamber 108, etc.). In some embodiments, the intake chamber 108 may be offset from the conduit axis 106 (e.g., the conduit axis 106 extends adjacent to a center point of the intake chamber 108, etc.).

In some embodiments, the exhaust conduit system 104 also includes an introduction conduit 109 (e.g., decomposition housing, decomposition reactor, decomposition chamber, reactor pipe, decomposition tube, reactor tube, etc.). The introduction conduit 109 is configured to receive exhaust from the intake chamber 108. In various embodiments, the introduction conduit 109 is coupled to the intake chamber 108. For example, the introduction conduit 109 may be fastened (e.g., using a band, using bolts, using twist-lock fasteners, threaded, etc.) to the intake chamber 108. In other embodiments, the introduction conduit 109 is integrally formed with the intake chamber 108. As utilized herein, the terms "fastened," "fastening," and the like, describe attachment (e.g., joining, etc.) of two structures in such a way that detachment (e.g., separation, etc.) of the two structures remains possible while "fastened" or after the "fastening" is completed, without destroying or damaging either or both of the two structures. The introduction conduit 109 is centered on the conduit axis 106 (e.g., the conduit axis 106 extends through a center point of the introduction conduit 109, etc.). In some embodiments, the introduction conduit 109 is formed by the coupling of the individual housings and chambers, as described herein.

The aftertreatment system 103 also includes a fluid delivery system 110. As is explained in more detail herein, the fluid delivery system 110 is configured to facilitate the introduction of one or more fluids (e.g., a liquid, a gas, or a combination thereof), such as a reductant (e.g., Adblue®, a urea-water solution (UWS), an aqueous urea solution, AUS32, etc.), air (e.g., ambient air), and/or hydrogen ($H_2$) into the exhaust. When the reductant is introduced into the exhaust, reduction of emission of undesirable components in the exhaust using the aftertreatment system 103 may be facilitated. When the hydrogen is introduced into the exhaust, the temperature of the de$SO_x$ and/or the ammonia slip control processes may be decreased. Further, when hydrogen is introduced into the exhaust, the temperature of the exhaust may increase. For example, the temperature of the exhaust may be increased by combusting the hydrogen within the exhaust (e.g., using a spark plug, etc.).

As shown in FIG. 1, the fluid delivery system 110 includes a first dosing module 112 (e.g., doser, etc.). The first dosing module 112 is configured to facilitate passage of the reductant fluid through the intake chamber 108 and into intake chamber 108. In some embodiments, the first dosing module 112 is positioned within a dosing module mount. The dosing module mount is configured to facilitate mounting of the first dosing module 112 to the intake chamber 108. The dosing module mount may provide insulation (e.g., thermal insulation, vibrational insulation, etc.) between the first dosing module 112 and the intake chamber 108. In some embodiments, the fluid delivery system 110 does not include the first dosing module 112. In some embodiments, the first dosing module 112 is a close coupled dosing module. That is, the first dosing module 112 is coupled to the introduction conduit 109 proximate an outlet of the hydrogen internal combustion engine system 101 (e.g., proximate an outlet of the hydrogen internal combustion engine 102). For example, the first dosing module 112 may be coupled to the introduction conduit 109 downstream from the hydrogen internal combustion engine system 101.

The fluid delivery system 110 also includes a reductant fluid source 114 (e.g., reductant tank, etc.). The reductant fluid source 114 is configured to contain the reductant fluid. The reductant fluid source 114 is configured to provide the reductant fluid to the first dosing module 112. The reductant fluid source 114 may include multiple reductant fluid sources 114 (e.g., multiple tanks connected in series or in parallel, etc.). The reductant fluid source 114 may be, for example, an exhaust fluid tank containing urea or a urea mixture.

The fluid delivery system 110 also includes a reductant fluid pump 116 (e.g., supply unit, etc.). The reductant fluid pump 116 is configured to receive the reductant fluid from the reductant fluid source 114 and to provide the reductant fluid to the first dosing module 112. The reductant fluid pump 116 is used to pressurize the reductant fluid from the reductant fluid source 114 for delivery to the first dosing module 112. In some embodiments, the reductant fluid pump 116 is pressure controlled. In some embodiments, the reductant fluid pump 116 is coupled to a chassis of a vehicle associated with the aftertreatment system 103.

In some embodiments, the fluid delivery system 110 also includes a reductant fluid filter 118. The reductant fluid filter 118 is configured to receive the reductant fluid from the reductant fluid source 114 and to provide the reductant fluid to the reductant fluid pump 116. The reductant fluid filter 118 filters the reductant fluid prior to the reductant fluid being provided to internal components of the reductant fluid pump 116. For example, the reductant fluid filter 118 may inhibit or prevent the transmission of solids to the internal components of the reductant fluid pump 116. In this way, the reductant fluid filter 118 may facilitate prolonged desirable operation of the reductant fluid pump 116.

The first dosing module 112 includes a first dosing module injector 120 (e.g., insertion device, etc.). The first dosing module injector 120 is configured to receive the reductant fluid from the reductant fluid pump 116, and to dose (e.g., provide, inject, insert, etc.) the reductant fluid received by the first dosing module 112 into the exhaust within the intake chamber 108.

In some embodiments, the fluid delivery system 110 also includes an air pump 122 and an air source 124 (e.g., air intake, etc.). The air pump 122 is configured to receive air from the air source 124. The air pump 122 is configured to provide the air to the first dosing module 112. In some applications, the first dosing module 112 is configured to mix the air and the reductant fluid into an air-reductant fluid mixture and to provide the air-reductant fluid mixture to the first dosing module injector 120 (e.g., for dosing into the exhaust within the intake chamber 108, etc.). As used herein, it is understood that a reductant fluid may include an air-reductant fluid mixture.

The first dosing module injector 120 is configured to receive the air from the air pump 122. The first dosing module injector 120 is configured to dose the air into the exhaust within the intake chamber 108. In some of these embodiments, the fluid delivery system 110 also includes an air filter 126. The air filter 126 is configured to receive the air from the air source 124 and to provide the air to the air pump 122. The air filter 126 is configured to filter the air prior to the air being provided to the air pump 122. In other embodiments, the fluid delivery system 110 does not include the air pump 122 and/or the fluid delivery system 110 does not include the air source 124. In such embodiments, the first dosing module 112 is not configured to mix the reductant fluid with the air.

In various embodiments, the first dosing module 112 is configured to receive air and reductant fluid and to dose the reductant fluid into the intake chamber 108 (e.g., via the injector 120). In various embodiments, the first dosing module 112 is configured to receive reductant fluid (and does not receive air) and dose the reductant fluid into the intake chamber 108 (e.g., via the injector 120).

In some embodiments, the fluid delivery system 110 includes a second dosing module 128 (e.g., doser, etc.). The second dosing module 128 is configured to facilitate passage of the hydrogen through the intake chamber 108 and into intake chamber 108. In some embodiments, the second dosing module 128 is positioned within a dosing module mount. The dosing module mount is configured to facilitate mounting of the second dosing module 128 to the intake chamber 108. The dosing module mount may provide insulation (e.g., thermal insulation, vibrational insulation, etc.) between the second dosing module 128 and the intake chamber 108. In some embodiments, the fluid delivery system 110 does not include the second dosing module 128. In some embodiments the second dosing module 128 is a close coupled dosing module. That is, the second dosing module 128 is coupled to the introduction conduit 109 proximate an outlet of the hydrogen internal combustion engine system 101 (e.g., proximate an outlet of the hydrogen internal combustion engine 102). For example, the second dosing module 128 may be coupled to the introduction conduit 109 downstream from the hydrogen internal combustion engine system 101.

The fluid delivery system 110 also includes a hydrogen source 130 (e.g., hydrogen tank, etc.). The hydrogen source 130 is configured to contain the hydrogen. The hydrogen source 130 is configured to provide the hydrogen to the second dosing module 128. The hydrogen source 130 may include multiple hydrogen sources 130 (e.g., multiple tanks connected in series or in parallel, etc.). In some embodiments, the hydrogen source 130 is the same as a hydrogen fuel source for the hydrogen internal combustion engine 102. In some embodiments, the hydrogen source 130 is separate from a hydrogen fuel source for the hydrogen internal combustion engine 102.

The fluid delivery system 110 also includes a hydrogen pump 132 (e.g., supply unit, etc.). The hydrogen pump 132 is configured to receive the hydrogen from the hydrogen source 130 and to provide the hydrogen to the second dosing module 128. The hydrogen pump 132 is used to pressurize the hydrogen from the hydrogen source 130 for delivery to the second dosing module 128. In some embodiments, the hydrogen pump 132 is pressure controlled. In some embodiments, the hydrogen pump 132 is coupled to a chassis of the system 100.

In some embodiments, the fluid delivery system 110 does not include a hydrogen pump 132. For example, the hydrogen source 130 may be a pressurized fluid tank. In these embodiments, the fluid delivery system 110 includes a hydrogen valve configured to receive the pressurized hydrogen from the hydrogen source 130 and to provide the hydrogen to the second dosing module 128. The hydrogen valve is operable between an open position and a closed position such that the hydrogen valve allows the hydrogen to flow from the hydrogen source 130 to the second dosing module 128 in the open or a partially open position (e.g., a position between the open position and the closed position. The hydrogen valve prevents the hydrogen from flowing from the hydrogen source 130 to the second dosing module 128 in the closed position.

In some embodiments, the fluid delivery system 110 also includes a hydrogen filter 134. The hydrogen filter 134 is configured to receive the hydrogen from the hydrogen source 130 and to provide the hydrogen to the hydrogen pump 132. The hydrogen filter 134 filters the hydrogen prior to the hydrogen being provided to internal components of the hydrogen pump 132. For example, the hydrogen filter 134 may inhibit or prevent the transmission of solids to the internal components of the hydrogen pump 132. In this way, the hydrogen filter 134 may facilitate prolonged desirable operation of the hydrogen pump 132.

The second dosing module 128 includes a second dosing module injector 136 (e.g., insertion device, etc.). The second dosing module injector 136 is configured to receive the hydrogen from the hydrogen pump 132 (or the hydrogen valve) and to dose (e.g., provide, inject, insert, etc.) the hydrogen received by the second dosing module 128 into the exhaust within the intake chamber 108.

In some embodiments, the air pump 122 and the air source 124 are coupled to the second dosing module 128 such that the air pump 122 and the air source 124 are configured to provide the air to the second dosing module 128. In some applications, the second dosing module 128 is configured to mix the air and the hydrogen into an air-hydrogen fluid mixture and to provide the air-hydrogen fluid mixture to the second dosing module injector 136 (e.g., for dosing into the exhaust within the intake chamber 108, etc.). In other embodiments, air pump 122 and/or the air source 124 is/are not coupled to the second dosing module 128. In such embodiments, the second dosing module 128 is not configured to mix the hydrogen with the air.

In various embodiments, the second dosing module 128 is configured to receive air and hydrogen, and to dose an air-hydrogen mixture into the intake chamber 108 (e.g., via the injector 136). In various embodiments, the second dosing module 128 is configured to receive hydrogen (and does not receive air), and to dose the hydrogen into the intake chamber 108 (e.g., via the injector 136).

As shown in FIG. 1, the system 100 also includes a controller 140 (e.g., control circuit, driver, etc.). The first dosing module 112, the reductant fluid pump 116, the air pump 122, the second dosing module 128, and the hydrogen pump 132 are also electrically or communicatively coupled to the controller 140. The controller 140 is configured to cause the first dosing module 112 to dose the reductant fluid into the intake chamber 108. The controller 140 may also be configured to cause the reductant fluid pump 116 and/or the air pump 122 to dose the reductant fluid into the intake chamber 108 in order to adjust an amount of the reductant fluid that is dosed into the intake chamber 108. The controller 140 is configured to cause the second dosing module 128 to dose the hydrogen into the intake chamber 108. The controller 140 may also be configured to cause the hydrogen pump 132 (or hydrogen valve) and/or the air pump 122 to dose the hydrogen into the intake chamber 108 in order to adjust an amount of the hydrogen that is dosed into the intake chamber 108.

The controller 140 includes a processing circuit 142. The processing circuit 142 includes a processor 144 and a memory 146. The processor 144 may include a microprocessor, an application-specific integrated circuit (ASIC), a field-programmable gate array (FPGA), etc., or combinations thereof. The memory 146 may include, but is not limited to, electronic, optical, magnetic, or any other storage or transmission device capable of providing a processor, ASIC, FPGA, etc. with program instructions. The memory 146 may include a memory chip, Electrically Erasable Programmable Read-Only Memory (EEPROM), Erasable Programmable Read Only Memory (EPROM), flash memory, or any other suitable memory from which the controller 140 can read instructions. The instructions may include code from any suitable programming language. The memory 146 may include various modules that include instructions that are configured to be implemented by the processor 144.

In various embodiments, the controller 140 is configured as a central controller (e.g., engine control unit (ECU), engine control module (ECM), etc.) that is configured to control the hydrogen internal combustion engine system 101. The hydrogen internal combustion engine system 101 includes one or more cylinders for combusting hydrogen fuel. Each cylinder may include a corresponding fuel injector configured to inject hydrogen fuel and/or air into the cylinder. By igniting the hydrogen in the cylinder, the hydrogen internal combustion engine system 101 generates power. In some embodiments, the controller 140 may be configured to cause the fuel injectors of the hydrogen internal combustion engine 102 to inject fuel into the hydrogen internal combustion engine 102. For example, the controller 140 may increase a fuel amount, decrease a fuel amount, increase an injection duration, decrease an injection duration, adjust an injection timing (e.g., a time between fuel injections, etc.), and/or otherwise adjust the operation of the fuel injectors.

In some embodiments, the controller 140 is communicable with a display device (e.g., screen, monitor, touch screen, heads-up display (HUD), indicator light, etc.). The display device may be configured to change state in response to receiving information from the controller 140. For example, the display device may be configured to change between a static state and an alarm state based on a communication from the controller 140. By changing state, the display device may provide an indication to a user of a status of the fluid delivery system 110.

The aftertreatment system 103 includes a catalyst member 150 (e.g., conversion catalyst member, selective catalytic reduction (SCR) catalyst member, catalytic metals, etc.). The catalyst member 150 is positioned downstream of the intake chamber 108. The catalyst member 150 is configured to cause decomposition of components of the exhaust using the reductant fluid (e.g., via catalytic reactions, etc.). The catalyst member 150 includes a catalyst housing 152. The catalyst housing 152 may be coupled to the intake chamber 108. In some embodiments, the catalyst housing 152 is integrally formed with the intake chamber 108. The catalyst member 150 includes a catalyst substrate 154. The catalyst substrate 154 is coupled to the catalyst housing 152. In some embodiments, the catalyst substrate 154 is integrally formed with the catalyst housing 152.

The catalyst member 150 receives the exhaust from the intake chamber 108. The exhaust flows through the catalyst substrate 154 and reacts with the catalyst substrate 154 so as to cause the exhaust to undergo the processes of evaporation, thermolysis, and/or hydrolysis to form non-$NO_x$ emissions within the introduction conduit 109 and/or the catalyst member 150. In some embodiments, the exhaust and the reductant fluid within the exhaust react with the catalyst substrate 154. In this way, the catalyst member 150 is configured to assist the reduction of $NO_x$ emissions by accelerating a $NO_x$ reduction process between the reductant (e.g., $NH_3$ and/or $H_2$) and the $NO_x$ of the exhaust into diatomic nitrogen, water, and/or carbon dioxide.

The reduction of $NO_x$ is referred to herein as "de$NO_x$." As used herein, the "de$NO_x$ performance" of the aftertreatment system 103, or more specifically, the catalyst substrate 154, refers to an amount or percentage of $NO_x$ that is reduced by the aftertreatment system 103.

In some embodiments, the aftertreatment system 103 includes a third dosing module 157. The third dosing module 157 is configured to dose the exhaust within the catalyst housing 152 with hydrogen. The third dosing module 157 is configured to facilitate passage of hydrogen through the catalyst housing 152 and into the catalyst housing 152 at the catalyst substrate 154. The third dosing module 057 includes a hydrogen injector 158 (e.g., insertion device, etc.). The hydrogen injector 159 is configured to dose the hydrogen into the exhaust within the catalyst housing 152. The third dosing module 157 may be coupled to the hydrogen source 130, the hydrogen pump 132 (or hydrogen valve), and/or the hydrogen filter 134.

In some embodiments, the air pump 122 is also configured to provide the air to the third dosing module 157. The third dosing module 157 is configured to provide the air into the catalyst housing 152. In some applications, the third dosing module 157 is configured to mix the air and the hydrogen into an air-hydrogen fluid mixture and to provide the air-hydrogen fluid mixture to the hydrogen injector 158 (e.g., for dosing into the exhaust within the catalyst housing 152, etc.).

In various embodiments, the third dosing module 157 is configured to receive air and hydrogen, and to dose an air-hydrogen mixture into the catalyst housing 152 (e.g., via the injector 158). In various embodiments, the third dosing module 157 is configured to receive hydrogen (and does not receive air) and dose the hydrogen into the catalyst housing 152 (e.g., via the injector 158).

In some embodiments, the third dosing module 157 is also electrically or communicatively coupled to the controller 140. The controller 140 is further configured to cause the third dosing module 157 to dose the hydrogen into the catalyst housing 152. The controller 140 may also be configured to cause the hydrogen pump 132 (or hydrogen valve) and/or the air pump 122 to dose the hydrogen into the catalyst housing 152 in order to adjust an amount of the hydrogen that is dosed into the catalyst housing 152. In some embodiments, the aftertreatment system 103 does not include the third dosing module 157.

The aftertreatment system 103 includes an ammonia slip catalyst substrate 156. The ammonia slip catalyst substrate 156 is positioned downstream of the catalyst member 150. In some embodiments, the ammonia slip catalyst substrate 156 is a coating applied to a portion of the outlet of the catalyst member 150. The ammonia slip catalyst substrate 156 is configured to receive the exhaust from the catalyst member 150 and assist in the reduction of the byproducts (e.g., ammonia, etc.) of the processes of the first dosing module 112 and the catalyst member 150. Specifically, the first dosing module 112 may introduce ammonia into the exhaust; however, a portion of the ammonia introduced may not react with the exhaust. As a result, excess ammonia may slip from the catalyst member 150 into the exhaust downstream of the catalyst member 150. The ammonia slip catalyst substrate 156 functions to reduce the ammonia such that the exhaust downstream of the ammonia slip catalyst substrate 156 does not contain an undesirable amount of ammonia. In some embodiments, the aftertreatment system 103 does not include the ammonia slip catalyst substrate 156.

In some embodiments, $SO_x$ may be present in the exhaust due to lubricating oil consumption (e.g., combustion) in the hydrogen internal combustion engine 102. The $SO_x$ may become trapped on the catalyst substrate 154 and/or the ammonia slip catalyst substrate 156. As more $SO_x$ binds to the catalyst substrate 154 and/or the ammonia slip catalyst substrate 156, the effectiveness of the catalyst substrate 154 and/or the ammonia slip catalyst substrate 156 may decrease. For example, if $SO_x$ binds to an SCR catalyst member, the SCR catalyst member may not be able to reduce $NO_x$ as effectively and/or if $SO_x$ binds to an ASC, the ASC may not be able to convert ammonia into nitrogen gas ($N_2$) and water ($H_2O$). Regenerating the catalyst substrate 154 and/or the ammonia slip catalyst substrate 156 to remove $SO_x$ from the catalyst substrate 154 and/or the ammonia slip catalyst substrate 156 advantageously enables the catalyst substrate 154 to more effectively reduce $NO_x$ and enables the ammonia slip catalyst substrate 156 to more effectively convert ammonia into $N_2$ and $H_2O$. As described herein, regenerating the catalyst substrate 154 and/or the ammonia slip catalyst substrate 156 in the presence of $H_2$ advantageously reduces a temperature of the regenerating process.

In some embodiments, $NH_3$ may be present in the exhaust due to overdosing reductant, changes in exhaust temperature, and/or changes in $NO_x$ concentration in the exhaust. The $NH_3$ may be stored on the catalyst substrate 154. However, in some conditions, such as increased exhaust temperature, decreased $NO_x$ concentration, or increased reductant dosing, at least a portion of the $NH_3$ stored by the catalyst substrate 154 may "slip" or flow downstream to the ammonia slip catalyst substrate 156. "Ammonia slip" refers to a condition when ammonia flows downstream of the catalyst substrate 154. To prevent ammonia slip, the ammonia slip catalyst substrate 156 converts $NH_3$ into $N_2$ and $H_2O$. The process of converting ammonia that has slipped into the ammonia slip catalyst substrate 156 is referred to herein as "ammonia slip control". As described herein, when the ammonia slip catalyst substrate 156 converts $NH_3$ into $N_2$ and $H_2O$, the presence of $H_2$ advantageously reduces a temperature of the ammonia slip control process.

As more $SO_x$ binds to the catalyst substrate 154 and/or the ammonia slip catalyst substrate 156, the effectiveness of the catalyst substrate 154 and/or the ammonia slip catalyst substrate 156 may decrease. For example, if $SO_x$ binds to a SCR catalyst member, the SCR catalyst member may not be able to reduce $NO_x$ as effectively and/or if $SO_x$ binds to an ASC, the ASC may not be able to convert ammonia into nitrogen gas ($N_2$) and water ($H_2O$). Regenerating the catalyst substrate 154 and/or the ammonia slip catalyst substrate 156 to remove $SO_x$ from the catalyst substrate 154 and/or the ammonia slip catalyst substrate 156 advantageously enables the catalyst substrate 154 to more effectively reduce $NO_x$ and enables the ammonia slip catalyst substrate 156 to more effectively convert ammonia into $N_2$ and $H_2O$. As described herein, regenerating the catalyst substrate 154 and/or the ammonia slip catalyst substrate 156 in the presence of $H_2$ advantageously reduces a temperature of the regenerating process.

The aftertreatment system 103 also includes a particulate filter assembly 160. The particulate filter assembly 160 includes a particulate filter housing 162. The particulate filter housing 162 is positioned downstream of the catalyst housing 152. In some embodiments, the particulate filter housing 162 is integrally formed with the catalyst housing 152. The particulate filter assembly 160 includes a particulate filter 164 (e.g., particulate filter (PF), filtration member, etc.). The particulate filter 164 is disposed within the particulate filter housing 162 such that the particulate filter 164 is positioned downstream of the catalyst member 150 (i.e., the catalyst member 150 is positioned upstream of the particulate filter 164). In some embodiments, the particulate filter housing 162 and the particulate filter 164 are positioned downstream of the intake chamber 108.

The particulate filter 164 is configured to remove particulates (e.g., soot, solidified hydrocarbons, ash, etc.) from the exhaust. For example, the particulate filter 164 may receive exhaust (e.g., from the catalyst member 150, from the intake chamber 108, etc.) having a first concentration of the particulates and may provide the exhaust downstream having a second concentration of the particulates, where the second concentration is lower than the first concentration. In this way, the particulate filter 164 may facilitate reduction of a particulate number (PN) of the exhaust. Decreasing the PN of the exhaust may be desirable in a variety of applications. For example, emissions regulations may prescribe a maximum PN for exhaust emitted into the atmosphere, and the particulate filter 164 may ensure that the PN of the exhaust emitted to the atmosphere by the aftertreatment system 103 is below the maximum PN.

The aftertreatment system 103 also includes an outlet chamber 190. The outlet chamber 190 is positioned downstream of the particulate filter 164 and is configured to receive the exhaust from the particulate filter 164. In various embodiments, the outlet chamber 190 is coupled to the particulate filter housing 162. For example, the outlet chamber 190 may be fastened to the particulate filter housing 162. In some embodiments, the outlet chamber 190 is coupled to the introduction conduit 109. In some embodiments, the outlet chamber 190 is the introduction conduit 109 (e.g., only the introduction conduit 109 is included in the exhaust conduit system 104, and the introduction conduit 109 functions as both the introduction conduit 109 and the outlet chamber 190). The outlet chamber 190 is centered on the conduit axis 106 (e.g., the conduit axis 106 extends through a center point of the outlet chamber 190, etc.).

In various embodiments, the exhaust conduit system 104 only includes a single conduit that functions as the intake chamber 108, the introduction conduit 109, and the outlet chamber 190.

In various embodiments, the aftertreatment system 103 also includes a first sensor 192 (e.g., $NO_x$ sensor, $NH_3$ sensor, $O_2$ sensor, particulate sensor, nitrogen sensor, etc.). The first sensor 192 is positioned downstream of the particulate filter housing 162. In some embodiments, the first sensor 192 is coupled to the outlet chamber 190. The first sensor 192 is configured to measure (e.g., sense, detect, etc.) a parameter (e.g., $NO_x$ concentration, $NH_3$ concentration, $O_2$ concentration, particulate concentration, nitrogen concentration, $SO_x$ concentration, etc.) of the exhaust and the reductant fluid downstream of the particulate filter housing 162. The first sensor 192 may be configured to measure the parameter within the outlet chamber 190. In some embodiments, the parameter measured by the first sensor 192 is the $NH_3$ concentration in the exhaust downstream of the particulate filter housing 162. In some embodiments, the parameter measured by the first sensor 192 is the $SO_x$ concentration of the exhaust within the outlet chamber 190. In some embodiments, the first sensor 192 measures both the $NH_3$ concentration and the $SO_x$ concentration.

The first sensor 192 is electrically or communicatively coupled to the controller 140 and is configured to provide a first signal associated with the parameter to the controller 140. The controller 140 (e.g., via the processing circuit 142, etc.) is configured to determine a first measurement based on the first signal. The controller 140 may be configured to cause the first dosing module 112, the second dosing module 128, the third dosing module 157, the reductant fluid pump 116, the air pump 122, and/or the hydrogen pump 132 (or hydrogen valve) to dose the reductant or the hydrogen into a corresponding section of the aftertreatment system 103 based on the first signal.

In various embodiments, the aftertreatment system 103 also includes a second sensor 196 (e.g., $NO_x$ sensor, $NH_3$ sensor, $O_2$ sensor, particulate sensor, nitrogen sensor, etc.). The second sensor 196 is positioned upstream of the catalyst member 150. In some embodiments, the second sensor 196 is coupled to the intake chamber 108 and positioned downstream of the hydrogen internal combustion engine system 101. The second sensor 196 is configured to measure (e.g., sense, detect, etc.) a parameter (e.g., $NO_x$ concentration, $NH_3$ concentration, $O_2$ concentration, particulate concentration, nitrogen concentration, $SO_x$ concentration, etc.) of the exhaust and the reductant fluid downstream of the hydrogen internal combustion engine system 101. The second sensor 196 may be configured to measure the parameter of the exhaust within the intake chamber 108. In some embodiments, the parameter measured by the second sensor 196 is the $NH_3$ concentration in the exhaust at the intake chamber 108. In some embodiments, the parameter measured by the second sensor 196 is the $SO_x$ concentration of the exhaust at the intake chamber 108. In some embodiments, the second sensor 196 measures both the $NH_3$ concentration and the $SO_x$ concentration.

The second sensor 196 is electrically or communicatively coupled to the controller 140 and is configured to provide a second signal associated with the parameter to the controller 140. The controller 140 (e.g., via the processing circuit 142, etc.) is configured to determine a second measurement based on the second signal. The controller 140 may be configured to cause the first dosing module 112, the second dosing module 128, the third dosing module 157, the reductant fluid pump 116, the air pump 122, and/or the hydrogen pump 132 (or hydrogen valve) to dose the reductant or the hydrogen into a corresponding section of the aftertreatment system 103 based on the second signal.

Figure 2:
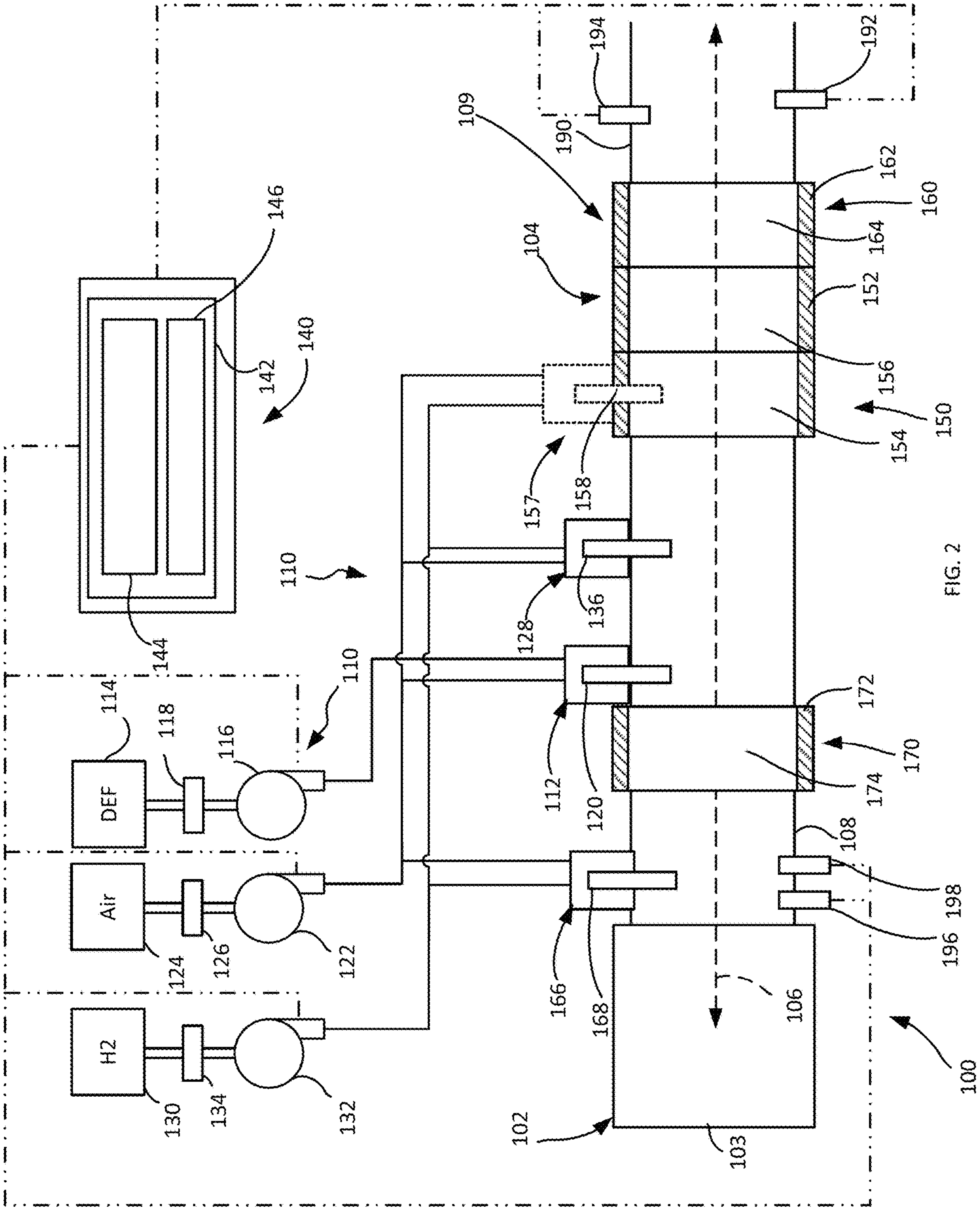
FIG. 2 is a schematic diagram of another system that includes a hydrogen internal combustion engine and an aftertreatment system.

Referring now to FIG. 2, the system 100 is shown according to various embodiments. The aftertreatment system 103 of FIG. 2 is substantially similar to the aftertreatment system 103 of FIG. 1. For example, as shown in FIG. 2, the aftertreatment system 103 includes an exhaust conduit system 104 centered on a conduit axis 106, an intake chamber 108, an introduction conduit 109, a fluid delivery system 110 (including the first dosing module 112, the second dosing module 128, and/or the third dosing module 157), a catalyst member 150, an ammonia slip catalyst substrate 156, a particulate filter assembly 160, an outlet chamber 190, a first sensor 192, and a second sensor 196.

In contrast with the aftertreatment system 103 shown in FIG. 1, the aftertreatment system 103 shown in FIG. 2 includes a fourth dosing module 166. The fourth dosing module 166 is positioned downstream of the hydrogen internal combustion engine system 101 at the intake chamber 108 and upstream of an oxidation catalyst member 170 (described below). The fourth dosing module 166 is configured to dose hydrogen into the exhaust within the intake chamber 108. The fourth dosing module 166 is configured to facilitate passage of hydrogen through the intake chamber 108 and into the intake chamber 108. The fourth dosing module 166 includes a hydrogen injector 168 (e.g., insertion device, etc.). The hydrogen injector 168 is configured to dose the hydrogen into the exhaust within the intake chamber 108. The fourth dosing module 166 may be coupled to the hydrogen source 130, the hydrogen pump 132 (or hydrogen valve), and/or the hydrogen filter 134.

In some embodiments, the air pump 122 is also configured to provide the air to the fourth dosing module 166. The fourth dosing module 166 is configured to provide the air into the intake chamber 108. In some applications, the fourth dosing module 166 is configured to mix the air and the hydrogen into an air-hydrogen fluid mixture and to provide the air-hydrogen fluid mixture to the hydrogen injector 168 (e.g., for dosing into the exhaust within the intake chamber 108, etc.).

In various embodiments, the fourth dosing module 166 is configured to receive air and hydrogen, and to dose an air-hydrogen mixture into the intake chamber 108 (e.g., via the injector 168). In various embodiments, the fourth dosing module 166 is configured to receive hydrogen (and does not receive air), and doses the hydrogen into the intake chamber 108 (e.g., via the injector 168).

In some embodiments, the fourth dosing module 166 is also electrically or communicatively coupled to the controller 140. The controller 140 is further configured to cause the fourth dosing module 166 to dose the hydrogen into the intake chamber 108. The controller 140 may also be configured to cause the hydrogen pump 132 (or hydrogen valve) and/or the air pump 122 to dose hydrogen into the intake chamber 108 in order to control an amount of the hydrogen that is dosed into the intake chamber 108.

As briefly described above, the aftertreatment system 103 shown in FIG. 2 also includes an oxidation catalyst member 170 (e.g., first oxidation catalyst, etc.). The oxidation catalyst member 170 is positioned downstream of the hydrogen internal combustion engine system 101 and the fourth dosing module 166 and upstream of the first dosing module 112, the second dosing module 128, and the catalyst member 150.

The oxidation catalyst member 170 includes an oxidation catalyst housing 172. The oxidation catalyst housing 172 is coupled to the intake chamber 108. The oxidation catalyst housing 172 may also be integrally formed with the intake chamber 108.

The oxidation catalyst member 170 also includes an oxidation catalyst substrate 174 (e.g., DOC, etc.). The oxidation catalyst substrate 174 is positioned within the oxidation catalyst housing 172. The oxidation catalyst substrate 174 may be coupled to the oxidation catalyst housing 172. The exhaust, including $NO_x$, reacts with the oxidation catalyst substrate 174 and causes the conversion (e.g., oxidation) of nitrogen monoxide (NO) to nitrogen dioxide ($NO_2$) in the exhaust. For example, as the exhaust flows through the oxidation catalyst substrate 174, the NO reacts with the oxidation catalyst substrate 174 and begins to oxidize. The oxidation catalyst substrate 174 facilitates conversion of the NO in the exhaust into $NO_2$.

The oxidation catalyst substrate 174 may also facilitate conversion (e.g., oxidation) of the hydrogen ($H_2$) in the exhaust into water ($H_2O$). For example, as the exhaust flows through the oxidation catalyst substrate 174, the $H_2$ reacts with the oxidation catalyst substrate 174 and begins to oxidize into water. The oxidation reaction of hydrogen may cause the temperature of the exhaust at the oxidation catalyst member 170 to increase.

In some embodiments, the aftertreatment system 103 also includes one or more additional sensors (e.g., a $NO_x$ sensor, $NH_3$ sensor, $O_2$ sensor, particulate sensor, nitrogen sensor, etc.). For example, a third sensor 198 may be positioned upstream of the catalyst member 150 and downstream of the oxidation catalyst member 170. In some embodiments, the third sensor 198 is coupled to the introduction conduit 109. The third sensor 198 is configured to measure (e.g., sense, detect, etc.) a parameter (e.g., $NO_x$ concentration, $NH_3$ concentration, $O_2$ concentration, particulate concentration, nitrogen concentration, $SO_x$ etc.) of the exhaust upstream of the catalyst member 150. The third sensor 198 may be configured to measure a parameter of the exhaust within the introduction conduit 109. In some embodiments, the parameter measured by the third sensor 198 is the $NH_3$ concentration in the exhaust upstream of the catalyst member 150. In some embodiments, the parameter measured by the third sensor 198 is the $SO_x$ concentration in the exhaust downstream of the oxidation catalyst member 170 and upstream of the catalyst member 150. In some embodiments, the third sensor 198 measures both the $NH_3$ concentration and the $SO_x$ concentration.

The third sensor 198 is electrically or communicatively coupled to the controller 140 and is configured to provide a third signal associated with the parameter to the controller 140. The controller 140 (e.g., via the processing circuit 142, etc.) is configured to determine a third measurement based on the third signal. The controller 140 may be configured to cause the first dosing module 112, the second dosing module 128, the third dosing module 157, the reductant fluid pump 116, the air pump 122, and/or the hydrogen pump 132 (or hydrogen valve) to dose the reductant or the hydrogen into a corresponding section of the aftertreatment system 103 based on the third signal.

Figure 3:
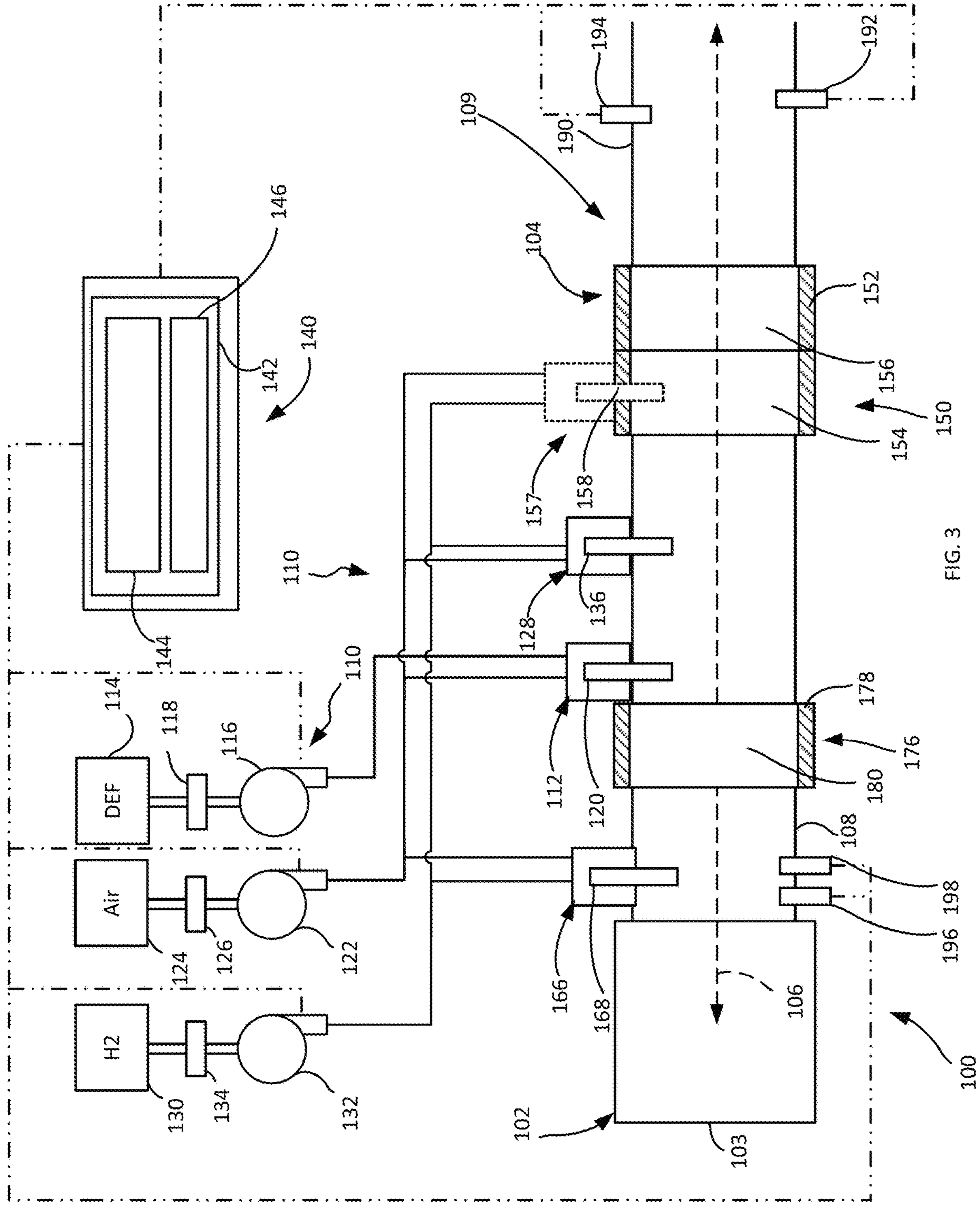
FIG. 3 is a schematic diagram of yet another system that that includes a hydrogen internal combustion engine and an aftertreatment system.

Referring now to FIG. 3, the system 100 is shown according to another embodiment. The aftertreatment system 103 of FIG. 3 is substantially similar to the aftertreatment system of FIGS. 1 and 2. For example, as shown in FIG. 3, the aftertreatment system 103 includes an exhaust conduit system 104 centered on a conduit axis 106, an intake chamber 108, an introduction conduit 109, a fluid delivery system 110 (including the first dosing module 112, the second dosing module 128, and/or the third dosing module 157), a controller 140, a catalyst member 150, an ammonia slip catalyst substrate 156, an outlet chamber 190, a first sensor 192, and a second sensor 196. The aftertreatment system 103 of FIG. 3 also includes the fourth dosing module 166. The fourth dosing module 166 is positioned downstream of the engine 102 at the intake chamber 108 and upstream of a catalyzed particulate filter assembly 176 (described below).

In contrast with the aftertreatment system 103 shown in FIGS. 1 and 2, the aftertreatment system 103 shown in FIG. 3 does not include a particulate filter assembly 160. Instead, the aftertreatment system 103 shown in FIG. 3 includes a catalyzed particulate filter assembly 176. The catalyzed particulate filter assembly 176 is positioned downstream of the hydrogen internal combustion engine system 101 and the fourth dosing module 166 and upstream of the first dosing module 112, the second dosing module 128, and the catalyst member 150.

The catalyzed particulate filter assembly 176 includes a particulate filter housing 178. The particulate filter housing 178 is positioned downstream of and/or within the intake chamber 108. In some embodiments, the particulate filter housing 178 is integrally formed with the intake chamber 108. The catalyzed particulate filter assembly 176 includes a catalyzed particulate filter 180 (e.g., particulate filter (PF), filtration member, etc.). The catalyzed particulate filter 180 is disposed within the particulate filter housing 178 such that the catalyzed particulate filter 180 is positioned upstream of the catalyst member 150 (i.e., the catalyst member 150 is positioned downstream of the catalyzed particulate filter 180).

The catalyzed particulate filter 180 is configured to remove particulates (e.g., soot, solidified hydrocarbons, ash, etc.) from the exhaust. For example, the catalyzed particulate filter 180 receives exhaust (e.g., from the hydrogen internal combustion engine system 101, from the intake chamber 108, etc.) having a first concentration of the particulates and provides the exhaust downstream having a second concentration of the particulates, where the second concentration is lower than the first concentration. In this way, the catalyzed particulate filter 180 facilitates reduction of the PN of the exhaust. Decreasing the PN of the exhaust may be desirable in a variety of applications. For example, emissions regulations may prescribe a maximum PN for exhaust emitted to the atmosphere, and the catalyzed particulate filter 180 may ensure that the PN of the exhaust emitted to the atmosphere by the aftertreatment system 103 is below the maximum PN.

The catalyzed particulate filter 180 has a catalyst coating. The catalyst coating is configured to react with a component of the exhaust to reduce undesirable components in the exhaust. According to various embodiments of the aftertreatment system 103, the catalyst coating is a platinum/palladium (Pt—Pd) alloy catalyst that facilitates conversion (e.g., oxidation) of NO in the exhaust into $NO_2$ and/or $H_2$ into $H_2O$. In some embodiments, the Pt—Pd catalyst coating of the catalyzed particulate filter 180 enables conversion of the exhaust constituents into ammonia ($NH_3$). For example, the Pt—Pd catalyst may facilitate the conversion of nitrogen ($N_2$) and $H_2$ into $NH_3$. Advantageously, the $NH_3$ synthesized at the catalyzed particulate filter 180 may flow downstream to the catalyst member 150. As described above, the $NH_3$ at the catalyst member 150 may be used in converting (e.g., reducing, etc.) $NO_x$ into $N_2$ and $H_2O$.

According to various embodiments of the aftertreatment system 103, the catalyst coating is an ammonia slip catalyst (ASC) that facilitates conversion (e.g., oxidation) of NO in the exhaust into $N_2$ and $H_2O$ in the presence of $H_2$ and/or $NH_3$. For example, the ASC coating of the catalyzed particulate filter 180 may facilitate the conversion of NO in the exhaust into $N_2$ and $H_2O$. In some embodiments, the ASC may convert the NO into $N_2$ and/or $H_2O$ with less NH3 compared to the ASC substrate 156 by using the $H_2$ present in the exhaust.

Figure 4:
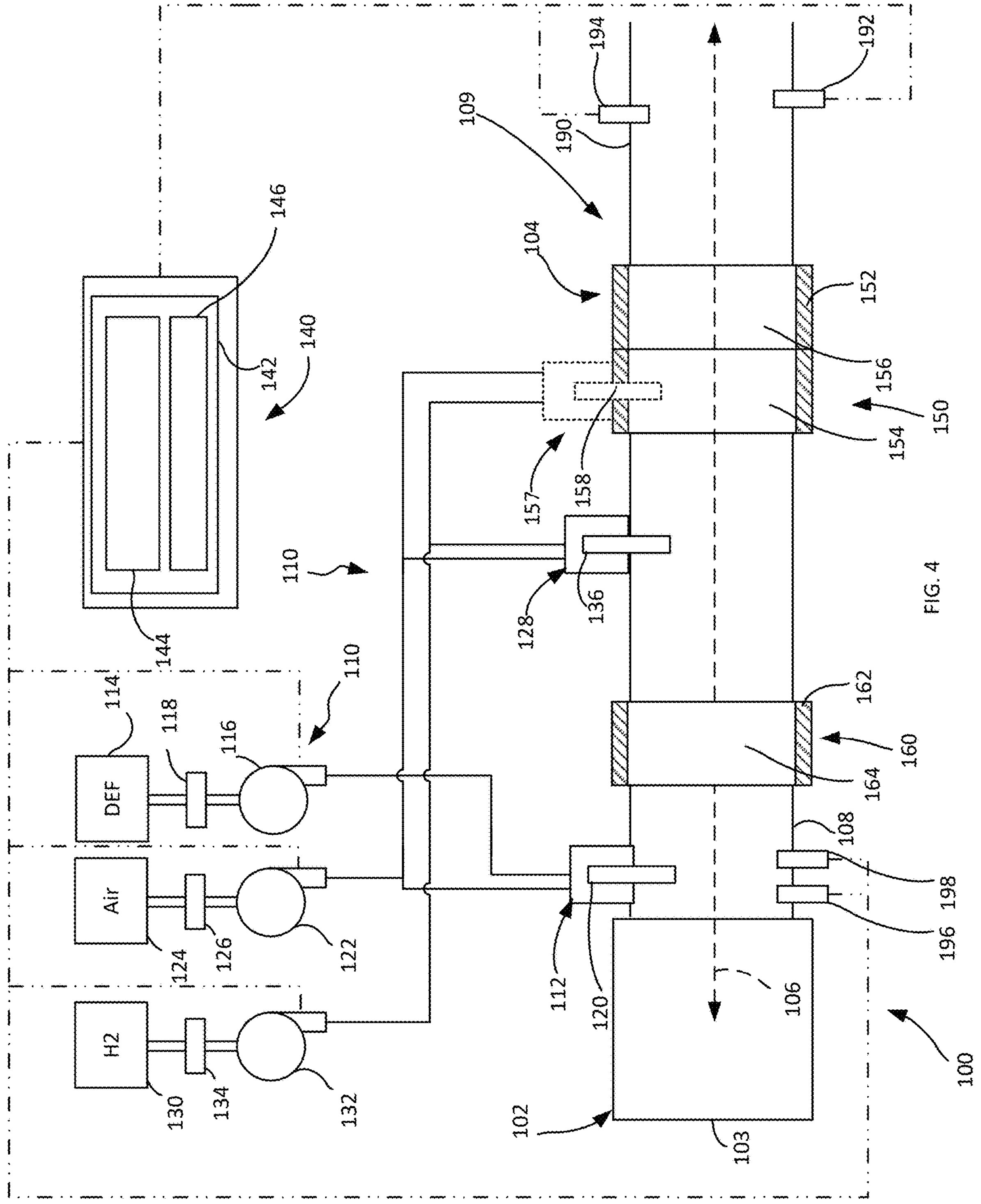
FIG. 4 is a schematic diagram of yet another system that that includes a hydrogen internal combustion engine and an aftertreatment system.

Referring now to FIG. 4, the system 100 is shown according to various embodiments. The aftertreatment system 103 of FIG. 4 is substantially similar to the aftertreatment system of FIGS. 1, 2, and 3. For example, as shown in FIG. 4, the aftertreatment system 103 includes an exhaust conduit system 104 centered on a conduit axis 106, an intake chamber 108, an introduction conduit 109, a fluid delivery system 110 (including the first dosing module 112, the second dosing module 128, and/or the third dosing module 157), a controller 140, a catalyst member 150, an ammonia slip catalyst substrate 156, an outlet chamber 190, a first sensor 192, and a second sensor 196.

In contrast with the aftertreatment system 103 shown in FIG. 1, the aftertreatment system 103 shown in FIG. 4, the particulate filter assembly 160 is positioned downstream of the hydrogen internal combustion engine system 101 and the first dosing module 112 and upstream of the second dosing module 128 and the catalyst member 150. The position of the particulate filter assembly upstream of the catalyst member 150 advantageously enables the particulate filter assembly 160 to capture particulate matter upstream of the catalyst member 150 and decreases the amount of particulate matter that enters the catalyst member 150. The position of the particulate filter assembly downstream of the first dosing module 112 advantageously enables the particulate filter assembly 160 to receive the reductant dosed by the first dosing module 112. The particulate filter 164 advantageously facilitates the decomposition of the reductant, allowing the decomposed reductant (e.g., $NH_3$) to enter the catalyst member 150 and/or captures undecomposed reductant preventing the undecomposed reductant (e.g., urea) from entering the catalyst member 150.

Figure 5:
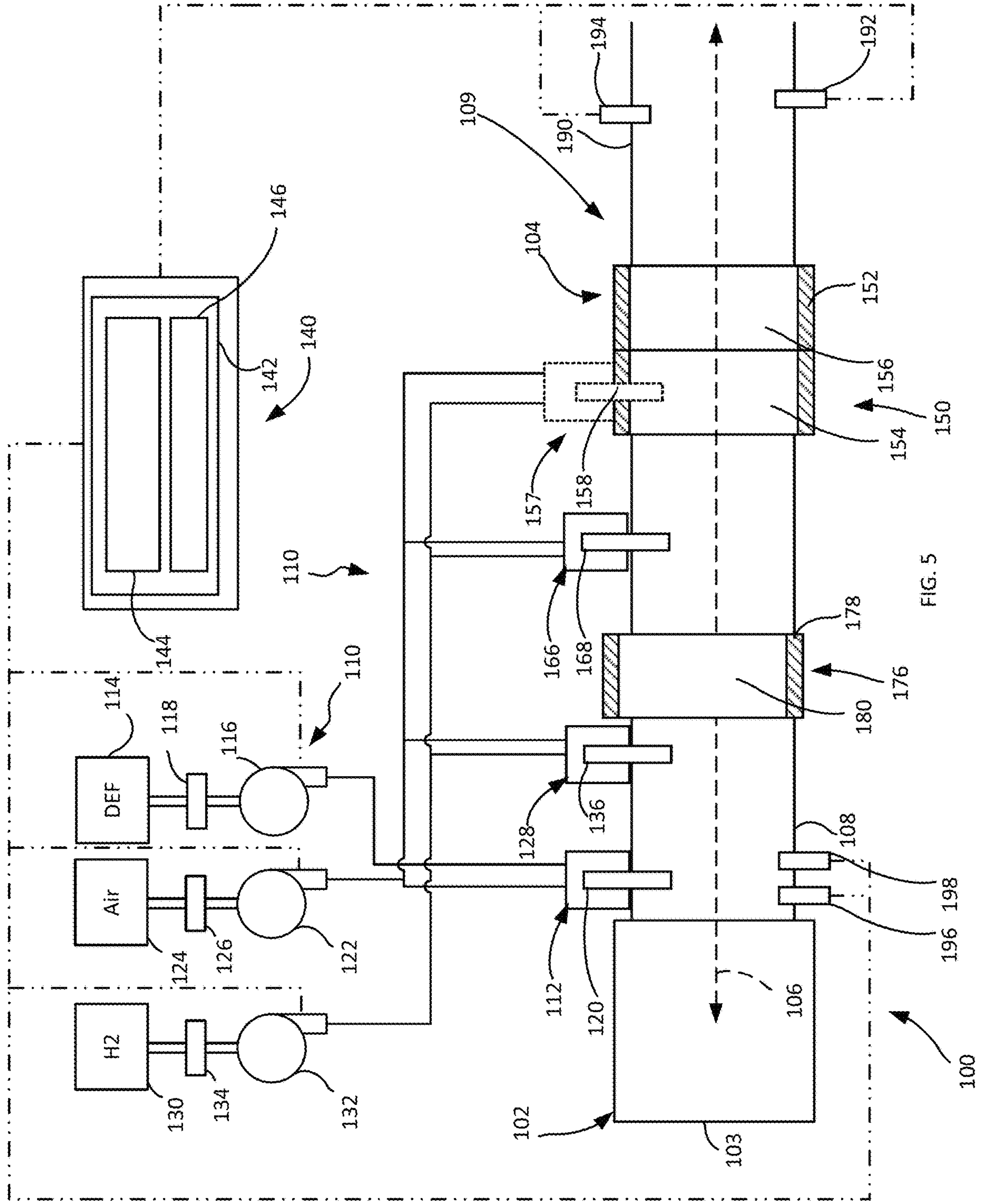
FIG. 5 is a schematic diagram of yet another system that that includes a hydrogen internal combustion engine and an aftertreatment system.

Referring now to FIG. 5, the system 100 is shown according to another embodiment. The aftertreatment system 103 of FIG. 5 is substantially similar to the aftertreatment system 103 of FIGS. 1, 2, and 3. For example, as shown in FIG. 5, the aftertreatment system 103 includes an exhaust conduit system 104 centered on a conduit axis 106, an intake chamber 108, an introduction conduit 109, a fluid delivery system 110 (including the first dosing module 112, the second dosing module 128, and/or the third dosing module 157), a controller 140, a catalyst member 150, an ammonia slip catalyst substrate 156, an outlet chamber 190, a first sensor 192, and a second sensor 196.

The aftertreatment system 103 shown in FIG. 5 also includes the catalyzed particulate filter assembly 176 and the fourth dosing module 166. The catalyzed particulate filter assembly 176 is positioned downstream of the first dosing module 112 and the second dosing module 128 and upstream of the fourth dosing module 166.

As described above with respect to FIG. 3, the catalyzed particulate filter assembly 176 includes a particulate filter housing 178. The particulate filter housing 178 is positioned downstream of and/or within the intake chamber 108. In some embodiments, the particulate filter housing 178 is integrally formed with the intake chamber 108. The catalyzed particulate filter assembly 176 includes a catalyzed particulate filter 180 (e.g., particulate filter (PF), filtration member, etc.). The catalyzed particulate filter 180 is disposed within the particulate filter housing 178 such that the catalyzed particulate filter 180 is positioned upstream of the catalyst member 150 (i.e., the catalyst member 150 is positioned downstream of the catalyzed particulate filter 180).

The catalyzed particulate filter 180 is configured to remove particulates (e.g., soot, solidified hydrocarbons, ash, etc.) from the exhaust. For example, the catalyzed particulate filter 180 may receive exhaust (e.g., from the hydrogen internal combustion engine system 101, from the intake chamber 108, etc.) having a first concentration of the particulates and may provide the exhaust downstream having a second concentration of the particulates, where the second concentration is lower than the first concentration. In this way, the catalyzed particulate filter 180 may facilitate reduction of the PN of the exhaust. Decreasing the PN of the exhaust may be desirable in a variety of applications. For example, emissions regulations may prescribe a maximum PN for exhaust emitted to the atmosphere, and the catalyzed particulate filter 180 may ensure that the PN of the exhaust emitted to the atmosphere by the aftertreatment system 103 is below the maximum PN.

In some embodiments, the catalyzed particulate filter 180 facilitates the decomposition of the reductant injected into the intake chamber 108 (e.g., by the first dosing module 112) allowing the decomposed reductant (e.g., $NH_3$) to enter the catalyst member 150 and/or captures undecomposed reductant preventing the undecomposed reductant (e.g., urea) from entering the catalyst member 150.

As described above with respect to FIG. 3, the catalyzed particulate filter 180 has a catalyst coating. The catalyst coating is configured to react with a component of the exhaust to reduce undesirable components in the exhaust.

The catalyst coating may be a SCR catalyst coating that facilitates conversion (e.g., reduction) of $NO_x$ in the exhaust into $N_2$ and $H_2O$ in the presence of $NH_3$ and/or $H_2$. For example, the SCR catalyst coating may facilitate the conversion of $NO_x$ in the exhaust into $N_2$ and $H_2O$ using the $NH_3$ and/or $H_2$ in the exhaust as reductants. Advantageously, the SCR catalyst coating may increase the overall de$NO_x$ performance of the aftertreatment system 103.

According to various embodiments of the aftertreatment system 103, the catalyst coating may be a hydrolysis catalyst coating. The hydrolysis catalyst coating may be wash-coated onto the particulate filter 180. The hydrolysis catalyst coating facilitates the hydrolysis of isocyanic acid (HNCO) and increases reductant conversion (e.g., decomposition of urea to $NH_3$). For example, $NH_3$ produced by urea decomposition is a reducing agent in the SCR process. The urea ($(NH_2)_2CO$) or a urea-water solution is injected into the intake chamber 108 and thermally decomposed into ammonia ($NH_3$) and isocyanic acid (HNCO) at the intake chamber 108 (Equation 1). HNCO is further hydrolyzed, producing another $NH_3$ molecule (Equation 2). The hydrolysis reaction of HNCO is slow in the gas phase, whereas it can be accelerated over the hydrolysis catalyst. The hydrolysis catalyst may include metal oxides and/or ion-exchanged zeolites. The hydrolysis catalyst wash-coated particulate filter 180 provides sufficient volume, surface area, and catalyst loading to decompose HNCO and to improve the $NH_3$ distribution to the catalyst member 150. For example, the hydrolysis catalyst wash-coated particulate filter 180 facilitates even distribution within the catalyst substrate 154, enabling more $NH_3$ molecules to react for $NO_x$ reduction.

(1)

$$(H_2N)_2CO \longrightarrow NH_3 + HNCO$$

(2)

$$HNCO + H_2O \longrightarrow NH_3 + CO_2$$

In some embodiments, the particulate filter 180 includes both the hydrolysis catalyst coating and the SCR catalyst coating. In these embodiments, the particulate filter 180 advantageously facilitates the hydrolysis of HNCO and increases the overall $deNO_x$ performance of the aftertreatment system 103. For example, the hydrolysis catalyst coating facilitates the hydrolysis of HNCO, and the SCR catalyst coating increases $deNO_x$ performance by reducing at least a portion of the $NO_x$ in the exhaust.

Figure 6:
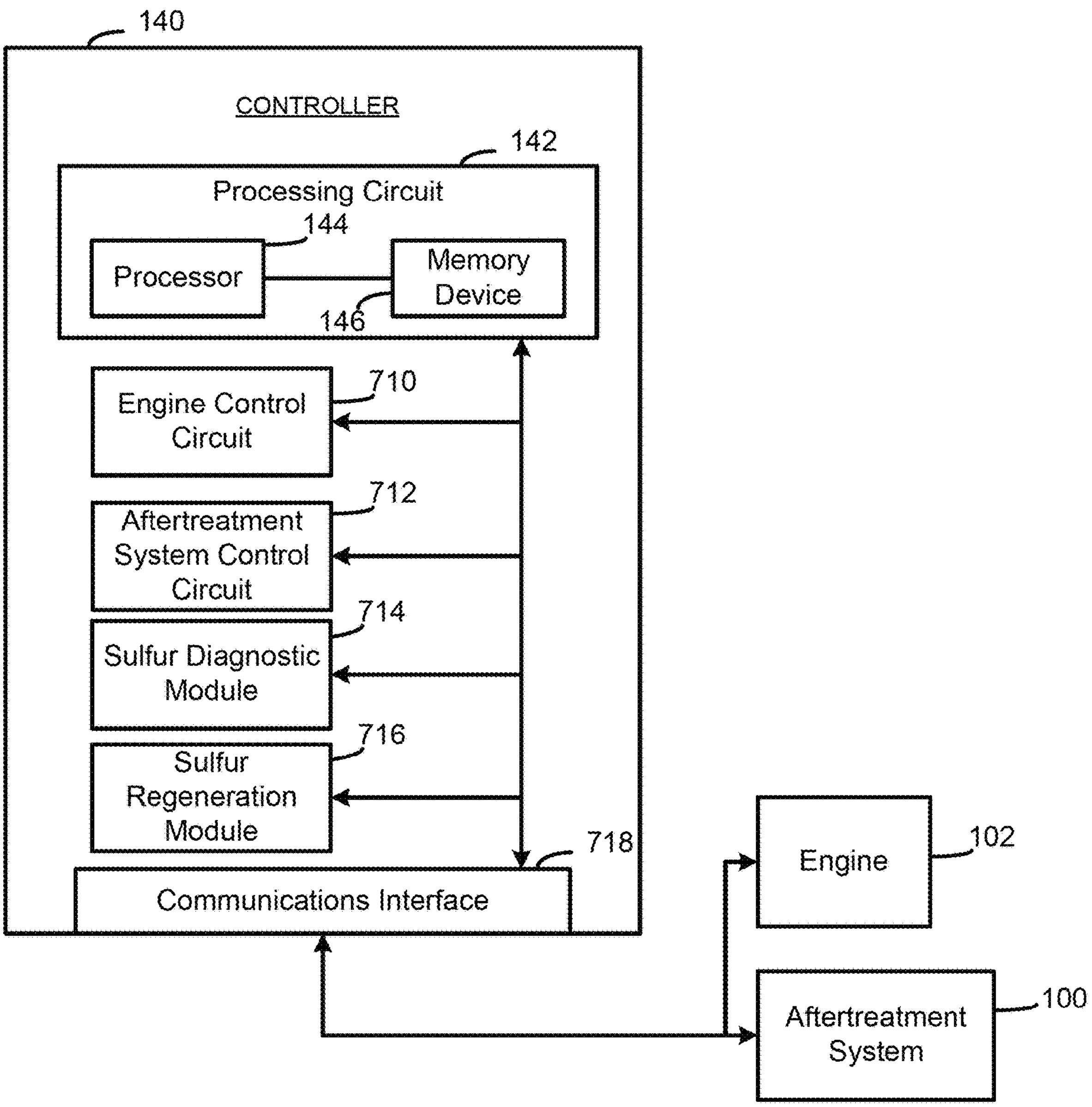
FIG. 6 is a schematic diagram of a controller for in a system that includes a hydrogen internal combustion engine and an aftertreatment system.

Referring now to FIG. 6, a schematic diagram of the controller 140 is shown, according to an example embodiment. As briefly described above, the controller 140 includes the processing circuit 142 having the processor 144 and the memory 146. As shown in FIG. 6, the controller 140 also includes an engine control module 710, an aftertreatment system control module 712, a sulfur diagnostic module 714, a sulfur regeneration module 716, and a communications interface 718. The controller 140 is structured to monitor and control the engine system 101 and/or the aftertreatment system 103. More specifically, the controller 140 may determine that the aftertreatment system 103 is operating abnormally (e.g., one or more parameters are below minimum thresholds, above maximum thresholds, or outside of predefined acceptable threshold ranges) and adjust output parameters of the aftertreatment system 103 and/or the engine 102 (e.g., by adjusting the usage of the hydrogen internal combustion engine 102 and/or the first dosing module 112, the second dosing module 128, the third dosing module 157, and/or the fourth dosing module 166) such that the system 100 operates at a target output (e.g., a target exhaust gas temperature, a target $deNO_x$, a target $deSO_x$, and/or a target $NH_3$ storage amount).

In one configuration, the engine control module 710, the aftertreatment system control module 712, the sulfur diagnostic module 714, and/or the sulfur regeneration module 716 are embodied as machine or computer-readable media storing instructions that are executable by a processor, such as processor 144. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media instructions may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the engine control module 710, the aftertreatment system control module 712, the sulfur diagnostic module 714, and/or the sulfur regeneration module 716 are embodied as hardware units, such as one or more electronic control units. As such, the engine control module 710, the aftertreatment system control module 712, the sulfur diagnostic module 714, and/or the sulfur regeneration module 716 may be embodied as one or more circuitry components including, but not limited to, processing circuitry, network interfaces, peripheral devices, input devices, output devices, sensors, etc.

In yet another configuration, the engine control module 710, the aftertreatment system control module 712, the sulfur diagnostic module 714, and/or the sulfur regeneration module 716 are embodied as software stored in the stored in the memory 146. As such the engine control module 710, the aftertreatment system control module 712, the sulfur diagnostic module 714, and/or the sulfur regeneration module 716 may include or store instructions that are executable by a processor, such as the processor 144.

In some embodiments, the engine control module 710, the aftertreatment system control module 712, the sulfur diagnostic module 714, and/or the sulfur regeneration module 716 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the engine control module 710, the aftertreatment system control module 712, the sulfur diagnostic module 714, and/or the sulfur regeneration module 716 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on. The engine control module 710, the aftertreatment system control module 712, the sulfur diagnostic module 714, and/or the sulfur regeneration module 716 may also include or be programmable hardware devices such as field programmable gate arrays, programmable array logic, programmable logic devices or the like.

The engine control module 710, the aftertreatment system control module 712, the sulfur diagnostic module 714, and/or the sulfur regeneration module 716 may include one or more memory devices for storing instructions that are executable by the processor(s) of the engine control module 710, the aftertreatment system control module 712, the sulfur diagnostic module 714, and/or the sulfur regeneration module 716. The one or more memory devices and processor(s) may have the same definition as provided below with respect to the memory 146 and processor 144. In some hardware unit configurations, the engine control module 710, the aftertreatment system control module 712, the sulfur diagnostic module 714, and/or the sulfur regeneration module 716 may be geographically dispersed throughout separate locations in the vehicle. Alternatively and as shown, the engine control module 710, the aftertreatment system control module 712, the sulfur diagnostic module 714, and/or the sulfur regeneration module 716 may be embodied in or within a single unit/housing, which is shown as the controller 140.

In the example shown, the controller 140 includes the processing circuit 142 having the processor 144 and the memory 146. The processing circuit 142 may be structured or configured to execute or implement the instructions, commands, and/or control processes described herein with respect to the engine control module 710, the aftertreatment system control module 712, the sulfur diagnostic module 714, and/or the sulfur regeneration module 716. The depicted configuration represents the engine control module 710, the aftertreatment system control module 712, the sulfur diagnostic module 714, and/or the sulfur regeneration module 716 being embodied as machine or computer-readable media storing instructions. However, as mentioned above, this illustration is not meant to be limiting as the present disclosure contemplates other embodiments the engine control module 710, the aftertreatment system control module 712, the sulfur diagnostic module 714, and/or the sulfur regeneration module 716 is configured as a hardware unit. All such combinations and variations are intended to fall within the scope of the present disclosure.

As briefly described above, the processor 144 may be implemented as one or more single- or multi-chip processors, digital signal processors (DSPs), application specific integrated circuits (ASICs), field programmable gate arrays (FPGAs), and/or suitable processors (e.g., other programmable logic devices, discrete hardware components, etc. to perform the functions described herein). A processor may be a microprocessor, a group of processors, etc. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the engine control module 710, the aftertreatment system control module 712, the sulfur diagnostic module 714, and/or the sulfur regeneration module 716 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

As briefly described above, the memory 146 (e.g., memory, memory unit, storage device) may include one or more devices (e.g., RAM, ROM, Flash memory, hard disk storage) for storing data and/or computer code for completing or facilitating the various processes, layers and modules described in the present disclosure. For example, the memory 146 may include dynamic random-access memory (DRAM). The memory 146 may be communicably connected to the processor 144 to provide computer code or instructions to the processor 144 for executing at least some of the processes described herein. Moreover, the memory 146 may be or include tangible, non-transient volatile memory or non-volatile memory. Accordingly, the memory 146 may include database components, object code components, script components, or any other type of information structure for supporting the various activities and information structures described herein.

The communications interface 718 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with a remote server). For example and regarding out-of-vehicle/system communications, the communications interface 718 may include an Ethernet card and port for sending and receiving data via an Ethernet-based communications network and/or a Wi-Fi transceiver for communicating via a wireless communications network. The communications interface 718 may be structured to communicate via local area networks or wide area networks (e.g., the Internet) and may use a variety of communications protocols (e.g., IP, LON, Bluetooth, ZigBee, radio, cellular, near field communication).

In some embodiments, the controller 140 is structured or configured to cause the (e.g., the first sensor 192, the second sensor 196, and/or the third sensor 198) to acquire data. For example, the controller 140 may be structured to generate one or more control signals and transmit the control signals to the first sensor 192, the second sensor 196, and/or the third sensor 198 (e.g., to acquire data, etc.). The control signals may cause the first sensor 192, the second sensor 196, and/or the third sensor 198 to sense and/or detect the sensor data and/or provide the sensor data to the controller 140. In some embodiments, the controller 140 may be structured to estimate the sensor data (e.g., when the first sensor 192, the second sensor 196, and/or the third sensor 198 is/are virtual sensors). The "sensor data" may include temperature data (e.g., exhaust gas temperature, component temperature such as engine temperature, etc.), flow rate data (e.g., exhaust gas flow rate data, charge air flow rate, etc.), pressure data (e.g., engine cylinder pressure, coolant pressure, etc.), and/or other data related to the operation of the aftertreatment system 103 and/or the engine system 101.

The engine control module 710 is structured to cause the hydrogen internal combustion engine system 101 (e.g., the hydrogen internal combustion engine 102) to operate at a desired output value. More specifically, the engine control module 710 may be structured to cause hydrogen internal combustion engine 102 to operate in one or more engine operating modes. The engine operating modes may cause the hydrogen internal combustion engine 102 to output a predetermined amount of hydrogen in the exhaust. The predetermined amount of hydrogen values may be stored by the memory 146. The engine control module 710 may cause the hydrogen internal combustion engine 102 to adjust a hydrogen fuel injection timing, adjust a hydrogen fuel injection amount (e.g., a ratio of air to hydrogen fuel, referred to herein as an air to fuel ratio (AFR)), and/or adjust an intake valve and/or exhaust valve opening.

In some embodiments, to increase or decrease the hydrogen in the exhaust, the engine control module 710 may cause the hydrogen internal combustion engine 102 to adjust the AFR. For example, the engine control module 710 may cause the hydrogen internal combustion engine 102 increase or decrease the AFR. In some embodiments, when the AFR is approximately 1.0 or lower than 1.0, the amount of hydrogen in the exhaust may increase. In some embodiments, when the AFR is 2.5 or greater, the amount of hydrogen in the exhaust may increase. In some embodiments, when the AFR is greater than 1 and less than 2.5, the amount of hydrogen in the exhaust may decrease.

In some embodiments, the engine control module 710 may cause the hydrogen internal combustion engine 102 to delay a hydrogen fuel injection timing relative to an ignition event. To decrease the hydrogen in the exhaust, the engine control module 710 may cause the hydrogen internal combustion engine 102 to increase a time period between the fuel injection and an ignition event. To increase the hydrogen in the exhaust, the engine control module 710 may cause the hydrogen internal combustion engine 102 to decrease a time period between the fuel injection and an ignition event.

In some embodiments, the engine control module 710 may cause the hydrogen internal combustion engine 102 to adjust the operation of an intake valve and/or an exhaust valve of the hydrogen internal combustion engine 102. The intake valve may be operable between an open position that allows air to enter the internal combustion engine and a closed position that substantially prevents air from entering the internal combustion engine 102. The exhaust valve may be operable between an open position that allows exhaust to flow from the hydrogen internal combustion engine 102 to the aftertreatment system 103 and a closed position that substantially prevents air from flowing from entering the internal combustion engine 102 to the aftertreatment system 103. In some embodiments, to increase the amount of hydrogen in the exhaust, the engine control module 710 may cause the hydrogen internal combustion engine 102 to decrease a time period between the exhaust valve operating from a closed position to an open position and an ignition event. In some embodiments, to decrease the amount of hydrogen in the exhaust, the engine control module 710 may cause the hydrogen internal combustion engine 102 to increase a time period between the exhaust valve operating from a closed position to an open position and an ignition event. In some embodiments, to adjust the amount of hydrogen in the exhaust, the engine control module 710 may cause the hydrogen internal combustion engine 102 to adjust a time period between the intake valve operating from an open position to a closed position and an ignition event based on an AFR target. As described above, the AFR may be below 1.0 or above 2.5 to increase the amount of hydrogen in the exhaust and between 1.0 and 2.5 to decrease the amount of hydrogen in the exhaust.

In an example embodiment, the engine control module 710 may cause the hydrogen internal combustion engine 102 to operate in a first engine operating mode. The first engine operating mode causes the hydrogen internal combustion engine 102 to output a first amount of hydrogen in the exhaust. The engine control module 710 may cause the hydrogen internal combustion engine 102 to operate in a second engine operating mode. The second engine operating mode causes the hydrogen internal combustion engine 102 to output a second amount of hydrogen that is greater than the first amount.

The aftertreatment control circuit 712 is structured to cause one or more components (e.g., systems, devices, etc.) of the aftertreatment system 103 to perform operations. For example, the aftertreatment control circuit 712 may be structured to cause the dosing modules (e.g., the first dosing module 112, the second dosing module 128, the third dosing module 157, and/or the fourth dosing module 166) and/or the pumps (e.g., the reductant fluid pump 116, the air pump 122, the hydrogen pump 132) to dose an amount (e.g., a target amount) of reductant, reductant-air mixture, hydrogen, and/or hydrogen air-mixture into the aftertreatment system 103, such that the aftertreatment control circuit 712 may control an injection amount, an injection frequency, an injection concentration, and/or other parameters associated with operation of the dosing modules (e.g., the first dosing module 112, the second dosing module 128, the third dosing module 157, and/or the fourth dosing module 166) and/or the pumps (e.g., the reductant fluid pump 116, the air pump 122, the hydrogen pump 132). For example, the aftertreatment control circuit 712 is structured to increase and/or decrease an amount of hydrogen provided to the aftertreatment system 103.

The controller 140 is structured to detect and/or remove an amount of sulfur (e.g., $deSO_x$) from one or more components of the aftertreatment system 103, such as the catalyst substrate 154, the ASC substrate 156, the particulate filter 164, the oxidation catalyst substrate 174, and/or the catalyzed particulate filter 180. More specifically, the sulfur diagnostic module 714 is structured to determine a sulfur loading value (e.g., an amount of sulfur stored or trapped on or within one or more components of the aftertreatment system 103). The sulfur regeneration module 716 is structured to enable one or more controls to remove the sulfur (e.g., $deSO_x$) from the one or more components of the aftertreatment system 103. The operation of the sulfur diagnostic module 714 and the sulfur regeneration module 716 are described in greater detail herein with respect to FIG. 7.

Figure 8:
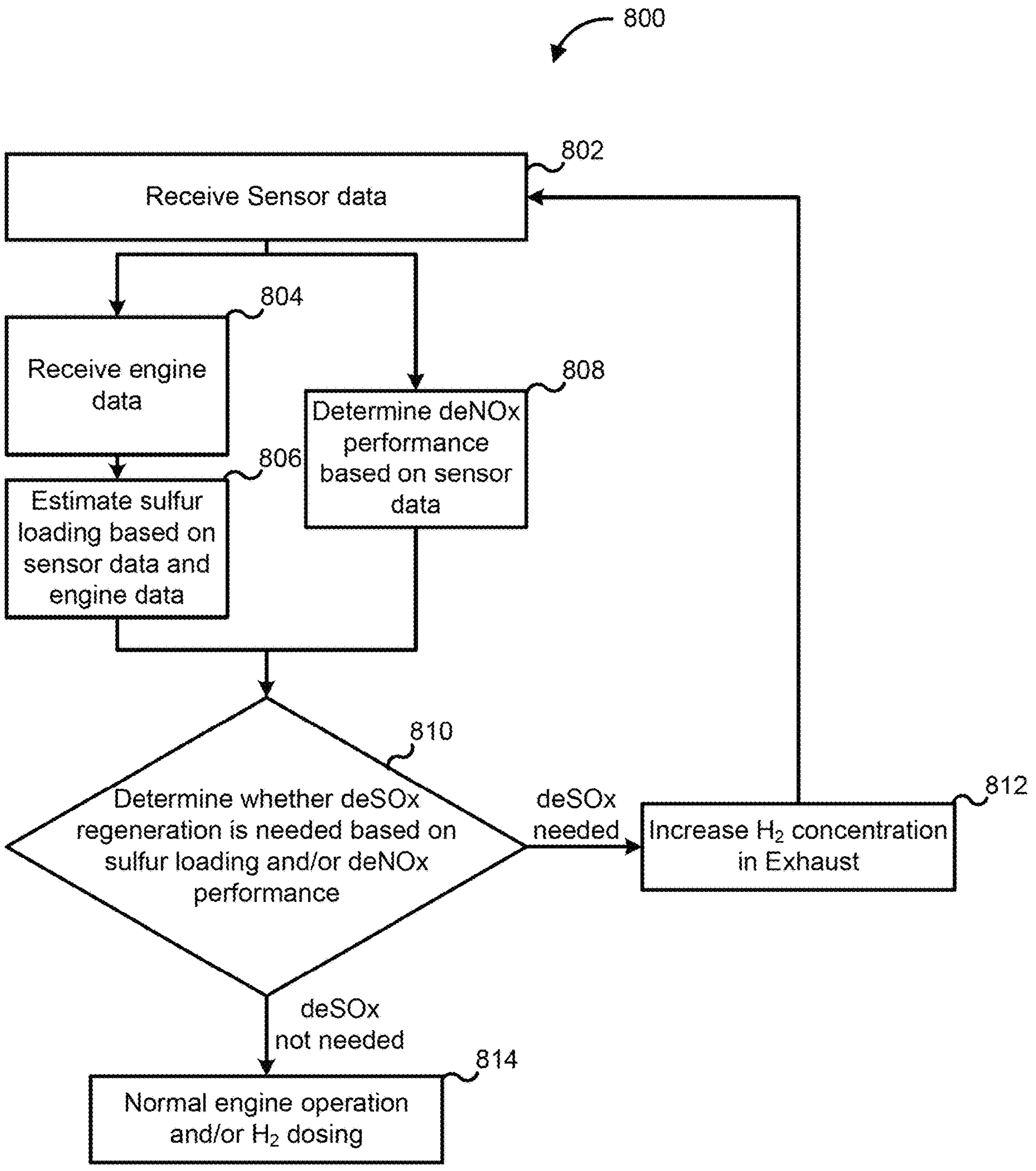
FIG. 8 is a flow diagram depicting a method of monitoring sulfur deposits and controlling a system that includes a hydrogen internal combustion engine and an aftertreatment system.

As described in further detail with respect to FIG. 8, the controller 140 is structured to determine whether a sulfur regeneration is needed. The controller 140 is structured to increase an amount of hydrogen in the exhaust responsive to determining that $deSO_x$ is needed. The controller 140 is structured to decrease or maintain a current amount of hydrogen in the exhaust responsive to determining that $deSO_x$ is not needed.

Figure 9:
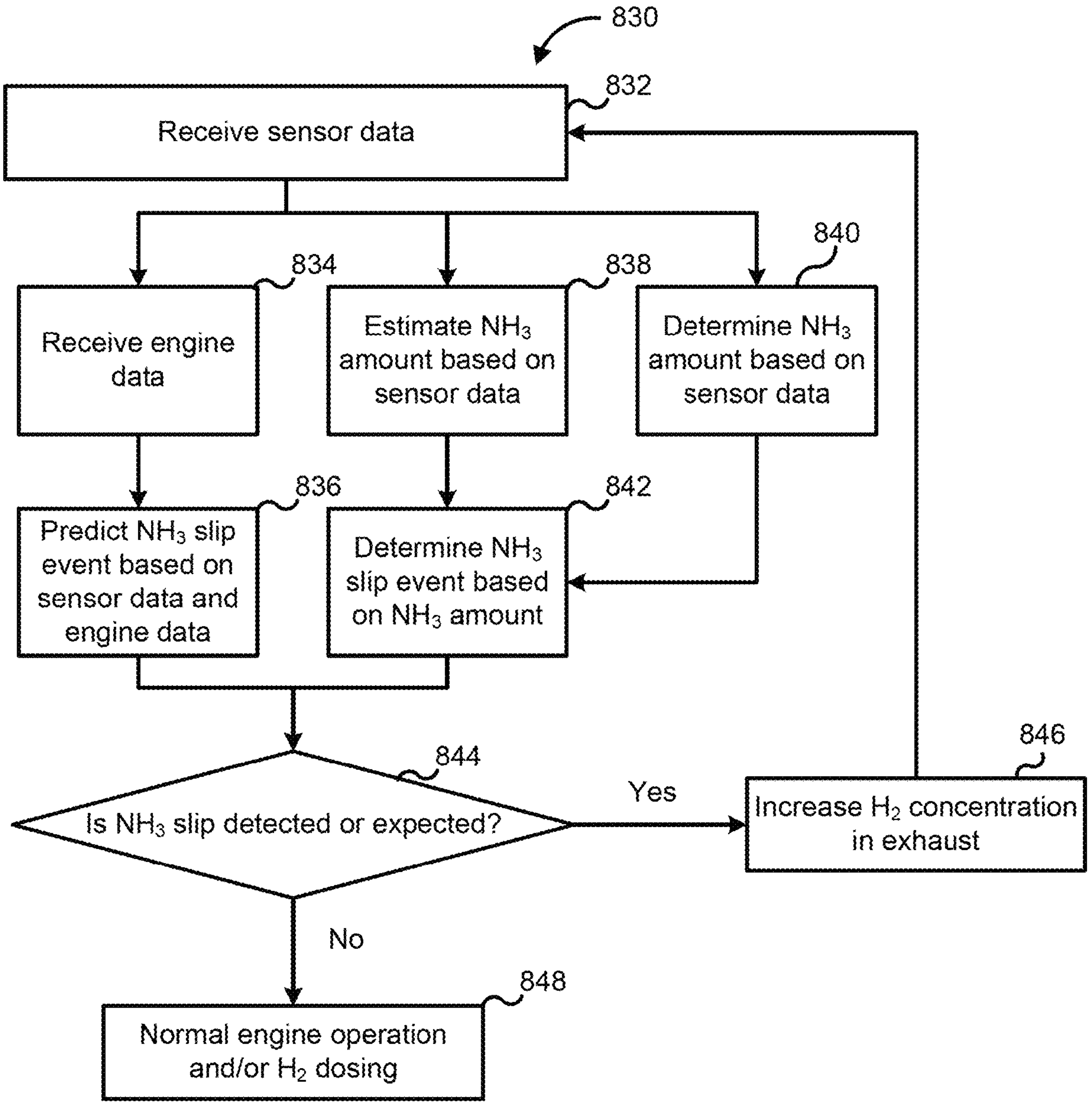
FIG. 9 is a flow diagram depicting a method of monitoring ammonia and controlling a system that includes a hydrogen internal combustion engine and an aftertreatment system.

As described in further detail with respect to FIG. 9, the controller 140 is structured to determine whether an ammonia slip event is occurring or expected to occur. For example, the controller 140 may compare an ammonia value to a corresponding threshold and determine that an ammonia slip event is occurring or expected to occur based on the ammonia value exceeding the corresponding threshold or determine that an ammonia slip event is not occurring or not expected to occur based on the ammonia value not exceeding the corresponding threshold. The controller 140 is structured to increase an amount of hydrogen in the exhaust responsive to determining that an ammonia slip event is occurring or expected to occur. The controller 140 is structured to decrease or maintain a current amount of hydrogen in the exhaust responsive to determining that an ammonia slip event is not occurring or not expected to occur.

Figure 7:
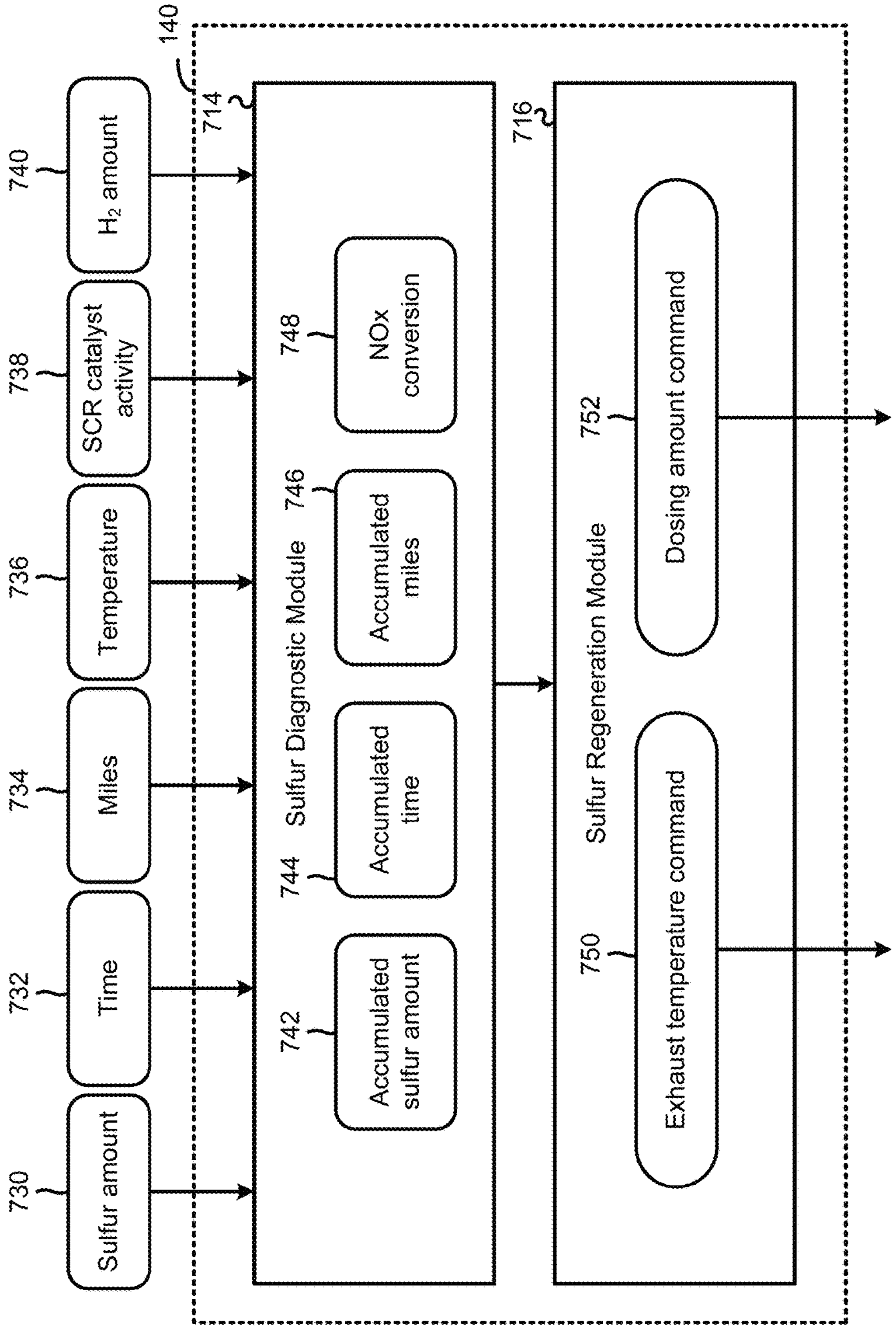
FIG. 7 is a flow diagram depicting a method of estimating sulfur deposits in a system that includes a hydrogen internal combustion engine and an aftertreatment system.

Referring now to FIG. 7, a flow diagram depicting a method of estimating sulfur deposits in the aftertreatment system 103. As briefly described above, the controller 140 is structured to detect and/or remove an amount of sulfur (e.g., $deSO_x$) from one or more components of the aftertreatment system 103. More specifically, the sulfur diagnostic module 714 is structured to determine a sulfur loading value and the sulfur regeneration module 716 is structured to enable one or more controls to remove the sulfur (e.g., $deSO_x$) from the one or more components of the aftertreatment system 103.

As shown in FIG. 7, the sulfur diagnostic module 714 of the controller 140 receives one or more inputs, including a sulfur amount 730, a time duration 732, a number of miles 734, an exhaust temperature 736, SCR catalyst activity check 738, and/or a hydrogen amount 740. The inputs may be measured (e.g., by the first sensor 192, the second sensor 196, and/or the third sensor 198), calculated, and/or modeled (e.g., by the first sensor 192, the second sensor 196, and/or the third sensor 198 when a sensor is a virtual sensor and/or by the controller 140).

The sulfur amount 730 may include an amount of sulfur in the exhaust passing through the catalyst member 150. Sulfur may be present in the exhaust due to lubricating oil consumption (e.g., combustion) in the hydrogen internal combustion engine 102. The sulfur amount 730 may be measured and/or determined by the first sensor 192, the second sensor 196, and/or the third sensor 198.

The time duration 732 input may include an engine operating time, an operating time above a certain load threshold, and/or an amount of time that has passed since a previous deS$O_x$ event. In some embodiments, the time duration 732 is measured and/or determined by the first sensor 192, the second sensor 196, and/or the third sensor 198. In some embodiments, the time duration 732 is measured and/or determined by the controller 140.

The number of miles 734 input may include the number of miles passed or traveled since a previous deS$O_x$ event. In some embodiments, the number of miles 734 is measured and/or determined by the first sensor 192, the second sensor 196, and/or the third sensor 198. In some embodiments, the number of miles 734 is measured and/or determined by the controller 140.

The SCR catalyst activity 738 input may be an active or passive check of catalyst activity. In some embodiments, the SCR catalyst activity 738 includes an indication of deN$O_x$ activity. For example, the SCR catalyst activity 738 input may include a first $NO_x$ value upstream of the catalyst member 150 and/or a second $NO_x$ value downstream of the catalyst member 150. The $NO_x$ value(s) is/are measured and/or determined by the first sensor 192, the second sensor 196, and/or the third sensor 198. The $NO_x$ value(s) is/are a measure of an amount (e.g., in mass, volume, weight, etc.) and/or a concentration (e.g., in parts per million, etc.) of $NO_x$ in the exhaust. The controller 140 may determine a rate of conversion of $NO_x$ to $N_2$ (e.g., a "$NO_x$ value" or, more specifically, a deN$O_x$ rate) by determining a difference between the first $NO_x$ value and the second $NO_x$ value.

In some embodiments, the SCR catalyst activity 738 may include an indication of a loss of activity based on the deN$O_x$ rate being below a corresponding threshold. The SCR catalyst activity 738 may include an indication that the catalyst member 150 is operating normally based on the deN$O_x$ rate being above a corresponding threshold.

In some embodiments, the SCR catalyst activity 738 includes an indication of $NH_3$ storage. For example, the SCR catalyst activity 738 input may include an $NH_3$ value. The $NH_3$ value is a measure of an $NH_3$ storage capacity of the catalyst member 150 (e.g., an amount of $NH_3$ that the catalyst member 150 can store therein). The SCR catalyst activity 738 may include an indication of a loss of activity based on the $NH_3$ value being below a corresponding threshold. The SCR catalyst activity 738 may include an indication that the catalyst member 150 is operating normally based on the $NH_3$ value being above a corresponding threshold.

The $H_2$ amount 740 input may include an amount of $H_2$ in the exhaust passing through the catalyst member 150. The $H_2$ may be present in the exhaust due to a change in engine operation and/or dosing by the second dosing module 128, the third dosing module 157, and/or the fourth dosing module 166. The $H_2$ amount 740 may be measured and/or determined by of the first sensor 192, the second sensor 196, and/or the third sensor 198.

The sulfur diagnostic module 714 is configured to determine a sulfur amount on a component of the aftertreatment system, such as the catalyst member 150, or, more specifically, the catalyst substrate 154. Determining the sulfur amount includes any operation that provides an estimate of the amount of sulfur present on the catalyst substrate 154. In some embodiments, the operations to determine the sulfur amount on the catalyst substrate 154 may include monitoring SCR catalyst activity 738 to determine a $NO_x$ conversion value 748 (e.g., a deN$O_x$ rate). As described above, the SCR catalyst activity 738 may include a deN$O_x$ rate that corresponds to an amount of $NO_x$ that is converted to $N_2$ based on a change in $NO_x$ in the exhaust across the catalyst member 150. The sulfur diagnostic module 714 may use a lookup table and/or a model (e.g., a statistical model, a physics model, etc.) that correlates the deN$O_x$ rate to determine a sulfur loading value. Thus, the sulfur diagnostic module 714 may determine the sulfur loading value based on the SCR catalyst activity 738.

In some embodiments, the operations to determine the sulfur amount on the catalyst substrate 154 may include determining an accumulated sulfur amount 742 based on the sulfur amount 730 input. As described above, the sulfur amount 730 may be measured and/or estimated by the first sensor 192, the second sensor 196, and/or the third sensor 198. The sulfur diagnostic module 714 may determine the accumulated sulfur amount 742 based on the sulfur amount 730 measured (or determined) over a predefined period (e.g., the time 732 and/or the miles 734).

In some embodiments, the operations to determine the sulfur amount on the catalyst substrate 154 may include determining an accumulated time 744 based on the time duration 732 input and/or an accumulated miles 746 based on the miles 734 input. The sulfur diagnostic module 714 may use a lookup table and/or a model (e.g., a statistical model, a physics model, etc.) that correlates the accumulated time 744 and/or the accumulated miles 746 to determine a sulfur loading value. Thus, the sulfur diagnostic module 714 may determine the sulfur loading value based on the SCR catalyst activity 738.

In some embodiments, the sulfur diagnostic module 714 may use equation (3) to determine a sulfur loading rate based on an oil consumption estimate and an oil sulfur content limit. The oil consumption estimate is a value that represents an amount of lubricant oil that is consumed (e.g. combusted) by the hydrogen internal combustion engine 102. In some embodiments, the oil consumption estimate is measured and/or determined by of the first sensor 192, the second sensor 196, and/or the third sensor 198. In some embodiments, the oil consumption estimate is measured and/or determined by the controller 140. The oil sulfur content limit is a value that represents an amount of sulfur in the lubricating oil in parts per million by weight (ppmw). The sulfur diagnostic module 714 may use equation (4) to determine a sulfur exposure estimate (e.g., an amount of sulfur in the exhaust that is exposed to the catalyst substrate 154. The sulfur exposure estimate is based on the oil consumption estimate (in grams per hour), a time duration (in hours), and volume of the catalyst substrate 154 (in liters).

$$\text{Sulfur from oil consumption (g/hr)} = \text{Oil consumption estimate (g/hr)} \times \text{Oil sulfur content limit(ppmw)} \tag{3}$$

$$\text{Sulfur exposure estimate (g/L catalyst)} = [\text{Sulfur from oil consumption (g/hr)} \times \text{duration (hr)}] / \text{catalyst volume (L)} \tag{4}$$

The sulfur diagnostic module 714 is configured to output a predicted performance degradation of the catalyst substrate 154 based on any combination of the sulfur exposure estimate, the accumulated sulfur amount 742, one of the accumulated time 744, and/or the accumulated miles 746.

The sulfur regeneration module 716 is configured to determine a deSO$_x$ strategy based on the predicted performance degradation of the catalyst substrate 154. The deSO$_x$ strategy may define a deSO$_x$ interval, time, and temperature (e.g., performing a deSO$_x$ every several hundred hours, performing a deSO$_x$ every 0.5-1 g/L catalyst of sulfur exposure, etc.).

In some embodiments, the sulfur regeneration module 716 is configured to generate and provide an exhaust temperature command 750 for increasing the temperature of the exhaust. In some embodiments, the sulfur regeneration module 716 is configured to generate and provide a dosing amount command 752 for controlling an amount of reductant provided to the exhaust conduit system 104 by the first dosing module 112 and/or an amount of hydrogen provided to the exhaust conduit system 104 by the second dosing module 128, the third dosing module 157, and/or the fourth dosing module 166. The sulfur regeneration module 716 may generate and provide the exhaust temperature command 750 and/or the dosing amount command 752 responsive to the sulfur amount on the catalyst substrate 154 exceeding a corresponding threshold. The exhaust temperature command 750 and/or the dosing amount command 752 are provided to give sufficient temperature and reductant/$H_2$ activity, respectively, to regenerate the catalyst substrate 154 from sulfur poisoning.

In some embodiments, the exhaust temperature command 750 may cause the hydrogen internal combustion engine to change an operating mode form a first operating mode that outputs exhaust at a first temperature to a second operating mode that outputs exhaust at a second temperature that is greater than the first temperature. In some embodiments, the exhaust temperature command 750 may cause a heater (not shown) coupled to the aftertreatment system 103 to heat the exhaust within the exhaust conduit system 104. The heater is coupled to the aftertreatment system 103 upstream of the catalyst member 150. During operation, the heater may heat the exhaust such that the temperature of the exhaust is greater than a temperature of the catalyst member 150. In this way, the heater may cause the temperature of the catalyst member 150 to increase (e.g., via thermal transfer from the exhaust to the catalyst member 150). In some embodiments, the exhaust temperature command 750 may cause the exhaust to increase in temperature by a predetermined amount (e.g., a predetermined temperature change) or to a predetermined target temperature. The predetermined temperature change and/or the predetermined temperature target may depend on an amount of $H_2$ present in the exhaust.

In some embodiments, the dosing amount command 752 causes the first dosing module 112 to dose a predetermined amount of reductant into the exhaust conduit system 104. The predetermined amount of reductant may depend on the temperature of the exhaust and/or an amount of time available to perform the deSO$_x$. In some embodiments, the dosing amount command 752 causes the second dosing module 128, the third dosing module 157, and/or the fourth dosing module 166 to dose a predetermined amount of $H_2$ into the exhaust conduit system 104. The predetermined amount of $H_2$ may depend on the temperature of the exhaust and/or an amount of time available to perform the deSO$_x$.

Now referring to FIG. 8, a flow diagram depicting a method 800 of monitoring sulfur deposits and controlling the system 100 is shown, according to an example embodiment. In some embodiments, the controller 140 and/or one or more components thereof is/are configured to perform method 800. For example, the controller 140 and/or one or more components thereof may be structured to perform the method 800, alone or in combination with other devices such as the sensors (e.g., the first sensor 192, the second sensor 196, and/or the third sensor 198) and/or other components of the system 100. In the embodiment shown in FIG. 8, the method 800 is performed by the controller 140. In some embodiments, the processes of the method 800 may be performed in a different order than as shown in FIG. 8. In some embodiments, the method 800 may include more or fewer processes than as shown in FIG. 8. In some embodiments the processes of the method 800 may be performed concurrently, partially concurrently, or sequentially.

In broad overview of the method 800, the controller 140 may determine and/or estimate a deNO$_x$ performance and/or a sulfur loading value to determine whether a deSO$_x$ event is needed (also called a "deSO$_x$ strategy"). The deSO$_x$ strategy is determined based on the deNO$_x$ performance and/or the sulfur loading value.

At process 802, the controller 140 receives sensor data from one or more sensors (e.g., the first sensor 192, the second sensor 196, and/or the third sensor 198). The sensor data may include one or more of the sulfur amount 730, the exhaust temperature 736, the SCR catalyst activity check 738, and/or the hydrogen amount 740. In some embodiments, the sensor data includes one or more NO$_x$ values (e.g., a NO$_x$ value upstream of the catalyst member 150 and a NO$_x$ value downstream of the catalyst member 150). In some embodiments, the method 800 continues to process 804. In some embodiments, the method 800 continues to process 808. In some embodiments, the method 800 continues to both process 804 and process 808.

At process 804, the controller 140 receives engine data. The engine data may be received from an engine control unit/module (ECU/ECM) and/or one or more engine sensors. In some embodiments, the engine data includes one or more of the time duration 732 and/or the number of miles 734. In some embodiments, the engine data may further include one or more of an engine load, an engine speed (typically measured in rotations per minute), an engine runtime and/or other parameters associated with the hydrogen internal combustion engine 102. At process 806, the controller 140 estimates a sulfur loading based on the sensor data and the engine data. The process of estimating the sulfur loading is described herein with respect to FIG. 7.

At process 808, the controller 140 determines a deNO$_x$ performance based on the sensor data. The controller 140 may determine the deNO$_x$ performance by determining a difference between a NO$_x$ value of the exhaust upstream of the catalyst member 150 (e.g., a NO$_x$ measured or determined by the second sensor 196 and/or the third sensor 198) and a NO$_x$ value of the exhaust downstream of the catalyst member 150 (e.g., a NO$_x$ measured or determined by the first sensor 192). For example, the controller 140 may determine an amount or percentage of NO$_x$ reduced by the aftertreatment system 103 by determining a difference or percent difference between the NO$_x$ value of the exhaust upstream of the catalyst member 150 and the NO$_x$ value of the exhaust downstream of the catalyst member 150.

At process 810, the controller 140 determines whether a sulfur regeneration event is needed based on the sulfur loading and/or the deNO$_x$ performance. In some embodiments, the controller 140 compares the estimated sulfur loading to a corresponding threshold. Responsive to determining that the estimated sulfur loading exceeds the corresponding threshold, the controller 140 determines that a sulfur regeneration event is needed. Responsive to determining that the estimated sulfur loading is below the corresponding threshold, the controller 140 determines that a sulfur regeneration event is not needed. In some embodiments, the controller 140 compares the deNO$_x$ performance to a corresponding threshold. Responsive to determining that the deNO$_x$ performance is below the corresponding threshold, the controller 140 determines that a sulfur regeneration event is needed. Responsive to determining that the deNO$_x$ performance is above the corresponding threshold, the controller 140 determines that a sulfur regeneration event is not needed. In some embodiments, responsive to determining that the estimated sulfur loading exceeds the corresponding threshold and/or that the deNO$_x$ performance is below the corresponding threshold, the controller 140 determines that a sulfur regeneration event is needed.

In some embodiments, at process 810, the controller determines a deSO$_x$ efficiency. The controller 140 may determine the deSO$_x$ efficiency based on the temperature 736, the time 732, the hydrogen amount 740, and/or the ANR. In some embodiments, the deSO$_x$ efficiency may be determined based on a difference between an estimated sulfur amount before a deSOx event and an estimated sulfur amount after deSOx event. The estimated sulfur amount(s) may be determined by the sulfur diagnostic module 714, as described above with respect to FIG. 7. The controller 140 may determine, based on the deSO$_x$ efficiency, a predicted time interval until another deSO$_x$ event is needed. For example, the controller 140 may use a lookup table and/or a model (e.g., a physics model, a machine learning model, etc.) that correlates deSO$_x$ efficiency to predetermined time intervals between deSO$_x$ events to determine a predicted time interval until another deSO$_x$ event is needed. The controller 140 may determine that the deSO$_x$ event was unsuccessful based on the deSO$_x$ efficiency being below the deSO$_x$ efficiency threshold. The controller 140 may determine that the deSO$_x$ event was successful based on the deSO$_x$ efficiency being above the deSO$_x$ efficiency threshold.

In some embodiments, controller 140 may determine, based on the deSO$_x$ efficiency, if the deSO$_x$ event was unsuccessful. For example, the controller 140 may compare the deSO$_x$ efficiency to a predetermined deSO$_x$ efficiency threshold. The controller 140 may determine that the deSO$_x$ event was unsuccessful based on the deSO$_x$ efficiency being below the deSO$_x$ efficiency threshold. The controller 140 may determine that the deSO$_x$ event was successful based on the deSO$_x$ efficiency being above the deSO$_x$ efficiency threshold.

The method 800 may continue to process 812 responsive to determining that a sulfur regeneration event is needed. The method may continue to process 814 responsive to determining that a sulfur regeneration event is not needed.

At process 812, the controller 140 generates a command to increase the concentration of hydrogen in the exhaust. In some embodiments, the command is an engine command that causes the hydrogen internal combustion engine 102 to change from a first operating mode that outputs a first amount of hydrogen into the exhaust to a second operating mode that outputs a second amount of hydrogen into the exhaust, where the second amount is greater than the first amount. In some embodiments, the command is a dosing command that causes the second dosing module 128, the third dosing module 157, and/or the fourth dosing module 166 to change from a first dossing mode that doses a first amount of hydrogen into the exhaust to a second dosing mode that doses a second amount of hydrogen into the exhaust, where the second amount is greater than the first amount.

Advantageously, increasing the hydrogen in the exhaust may accelerate the redox cycle because hydrogen is more reducible than ammonia. Therefore, the removal of sulfur (e.g., SO$_x$) from the catalyst substrate 154 by increasing the hydrogen concentration advantageously increases the deNO$_x$ performance of the aftertreatment system 103.

At process 814, the controller 140 enables normal engine operating and/or hydrogen dosing. A normal engine operating mode may be a first engine operating mode that outputs a first amount of hydrogen into the exhaust. The normal hydrogen dosing may be a first dosing mode that causes the second dosing module 128, the third dosing module 157, and/or the fourth dosing module 166 to dose a first amount of hydrogen into the exhaust.

Now referring to FIG. 9, a flow diagram depicting a method 830 of monitoring ammonia and controlling the system 100 is shown, according to an example embodiment. In some embodiments, the controller 140 and/or one or more components thereof is/are configured to perform method 830. For example, the controller 140 and/or one or more components thereof may be structured to perform the method 830, alone or in combination with other devices such as the sensors (e.g., the first sensor 192, the second sensor 196, and/or the third sensor 198) and/or other components of the system 100. In the embodiment shown in FIG. 9, the method 830 is performed by the controller 140. In some embodiments, the processes of the method 830 may be performed in a different order than as shown in FIG. 9. In some embodiments, the method 830 may include more or fewer processes than as shown in FIG. 9. In some embodiments the processes of the method 830 may be performed concurrently, partially concurrently, or sequentially.

In broad overview of the method 830, the controller 140 may determine $NH_3$ slip or potential $NH_3$ slip event. Responsive to determining an $NH_3$ slip or potential $NH_3$ slip event the controller 140 may increase a hydrogen concentration in the exhaust. For example, the controller may generate an engine command to cause the hydrogen internal combustion engine 102 to operate in a different engine operating mode and/or generate a dosing command that causes the second dosing module 128, the third dosing module 157, and/or the fourth dosing module 166 to change to operate in a different dosing operating mode to increase $H_2$ concentration in the exhaust.

At process 832, the controller 140 receives sensor data from one or more sensors (e.g., the first sensor 192, the second sensor 196, and/or the third sensor 198). The sensor data may include one or more of the sulfur amount 730, the exhaust temperature 736, the SCR catalyst activity check 738, and/or the hydrogen amount 740. In some embodiments, the sensor data includes one or more $NH_3$ values (e.g., a $NH_3$ value upstream of the catalyst member 150 and a $NH_3$ value downstream of the catalyst member 150). In some embodiments, the sensor data includes one or more $NO_x$ values (e.g., a $NO_x$ value upstream of the catalyst member 150 and a $NO_x$ value downstream of the catalyst member 150). In some embodiments, the method 830 continues to process 834. In some embodiments, the method 800 continues to process 838. In some embodiments, the method 800 continues to process 840. In some embodiments, the method 800 continues to, process 834, process 838, and process 840.

At process 834, the controller 140 receives engine data. The engine data may be received from an engine control unit/module (ECU/ECM) and/or one or more engine sensors. In some embodiments, the engine data includes one or more of the time duration 732 and/or the number of miles 734. In some embodiments, the engine data may further include one or more of an engine load, an engine speed (typically measured in rotations per minute), an engine runtime and/or other parameter associated with the hydrogen internal combustion engine 102.

At process 836, the controller 140 predicts whether an $NH_3$ slip event is likely to occur based on the sensor data and the engine data. In some embodiments, the controller 140 uses a physical model of the aftertreatment system 103. The physical model may correlate the sensor data and/or the engine data (e.g., temperature, engine parameters, etc.) to an $NH_3$ value. The controller 140 may compare the $NH_3$ value to a corresponding threshold. Responsive to determining that the $NH_3$ value exceeds the corresponding threshold, the controller 140 determines that a $NH_3$ slip event is likely to occur. Responsive to determining that the $NH_3$ value is below the corresponding threshold, the controller 140 determines that a $NH_3$ slip event is not likely to occur. In some embodiments, the event, such as high temperature transients and/or rapid torque changes, may be indicative of a potential $NH_3$ slip event. The controller 140 may determine that a $NH_3$ slip event is likely to occur based on a temperature transient exceeding a corresponding threshold and/or based on a torque change exceeding a corresponding threshold.

At process 838, the controller 140 estimates a $NH_3$ value based on the sensor data. The estimated $NH_3$ value may be determined based on estimating an amount of ammonia stored by the catalyst member 150 based on the sensor data, including a first $NO_x$ value measured upstream of the catalyst member 150 and a $NO_x$ value measured downstream of the catalyst member 150, and a lookup table that correlates the first and second $NO_x$ values to the ammonia value. The method 830 may continue to process 842.

At process 840, the controller 140 determines an $NH_3$ value based on the sensor data. For example, when the sensor data include a measured $NH_3$ amount, the controller 140 determines the $NH_3$ value based on the measured $NH_3$ amount. The method 830 may continue to process 842.

At process 842, the controller 140 determines an $NH_3$ slip event based on the predicted or determined $NH_3$ amount. For example, the controller 140 may compare a predicted $NH_3$ amount and/or a determined $NH_3$ amount to a corresponding threshold. Responsive to determining that the predicted $NH_3$ amount and/or the determined $NH_3$ amount exceeds the corresponding threshold, the controller 140 determines an $NH_3$ slip event. Responsive to determining that that the predicted $NH_3$ amount and/or the determined $NH_3$ amount is less than the corresponding threshold, the controller 140 determines that there is not an $NH_3$ slip event.

In some embodiments, the controller 140 may determine and/or predict an $NH_3$ slip event based on other sensor data and/or engine data. In some embodiments, the controller 140 determines the $NH_3$ slip event based on a temperature of the catalyst substrate 154. For example, if the temperature of the catalyst substrate 154 with a measured or estimated amount of $NH_3$ increases beyond the capacity of the catalyst substrate 154 to store the measured or determined amount of $NH_3$, release of $NH_3$ will occur and result in $NH_3$ slip to the ammonia slip catalyst substrate 156. Responsive to determining that the temperature of the catalyst substrate 154 exceeds a corresponding threshold, the controller 140 determines an $NH_3$ slip event. Responsive to determining that temperature of the catalyst substrate 154 is less than the corresponding threshold, the controller 140 determines that there is not an $NH_3$ slip event.

In some embodiments, the controller 140 determines the $NH_3$ slip event based on a temperature of the ammonia slip catalyst substrate 156. For example, if the temperature of the ammonia slip catalyst substrate 156 is not sufficiently high to control the $NH_3$ slip event, some undesirable $NH_3$ slip to the outlet chamber 190 and out of the aftertreatment system 103 will occur. Responsive to determining that the temperature of the ammonia slip catalyst substrate 156 is below corresponding threshold, the controller 140 determines an $NH_3$ slip event. Responsive to determining that temperature of the ammonia slip catalyst substrate 156 is greater than the corresponding threshold, the controller 140 determines that there is not an $NH_3$ slip event.

In some embodiments, the controller 140 determines the $NH_3$ slip event based on large transient in $NO_x$ values. For example, if the amount of $NO_x$ output by the hydrogen internal combustion engine 102 into the exhaust decreases and the amount of $NH_3$ stored by the catalyst substrate 154 is high, some $NH_3$ may slip to the ammonia slip catalyst substrate 156. Responsive to determining that (i) the change in $NO_x$ values output by the hydrogen internal combustion engine 102 is above a corresponding threshold and (ii) the $NH_3$ value is above a corresponding threshold, the controller 140 determines an $NH_3$ slip event. Responsive to determining that (i) the change in $NO_x$ values output by the hydrogen internal combustion engine 102 is below a corresponding threshold and/or (ii) the $NH_3$ value is below a corresponding threshold, the controller 140 determines that there is not an $NH_3$ slip event.

At process 844, the controller 140 determines whether to increase $H_2$ concentration in the exhaust. Responsive to determining and/or predicting the $NH_3$ slip event, the controller 140 continues to process 846. Responsive to determining and/or predicting that there is not an $NH_3$ slip event, the controller 140 continues to process 848.

At process 846, the controller 140 generates a command to increase the concentration of hydrogen in the exhaust. In some embodiments, the command is an engine command that causes the hydrogen internal combustion engine 102 to change from a first operating mode that outputs a first amount of hydrogen into the exhaust to a second operating mode that outputs a second amount of hydrogen into the exhaust, where the second amount is greater than the first amount. In some embodiments, the command is a dosing command that causes the second dosing module 128, the third dosing module 157, and/or the fourth dosing module 166 to change from a first dossing mode that doses a first amount of hydrogen into the exhaust to a second dosing mode that doses a second amount of hydrogen into the exhaust, where the second amount is greater than the first amount. In some embodiments, the controller 140 may cause the hydrogen internal combustion engine 102 to operate in the second operating mode and/or the second dosing module 128, the third dosing module 157, and/or the fourth dosing module 166 to operate in the second operating mode until it is determined there is no longer NH3 slip or no slip concern anticipated with the predictive NH3 slip logic.

In some embodiments, increasing the concentration of $H_2$ in the exhaust advantageously mitigates $NH_3$ from slipping out of the ammonia slip catalyst substrate 156 during an $NH_3$ slip event. For example, by increasing the concentration of $H_2$ in the exhaust, the temperature at which the ammonia slip catalyst substrate 156 converts $NH_3$ into $N_2$ and $H_2O$ decreases thereby increasing the ability of the ammonia slip catalyst substrate 156 to convert $NH_3$ into $N_2$ and $H_2O$.

The ability of the ammonia slip catalyst substrate 156 to control NH3 slip at low temperatures advantageously allows for a more aggressive reductant dosing strategy to be implemented. By dosing more reductant (e.g., by the first dosing module 112) the catalyst substrate 154 may operate at higher levels of $NH_3$ storage than would be possible without the $H_2$ assisted $NH_3$ slip control strategy. Increasing the $NH_3$ may enable the catalyst substrate 154 to increase the $deNO_x$ efficiency.

At process 848, the controller 140 enables normal engine operating and/or hydrogen dosing. A normal engine operating mode may be the first engine operating mode that outputs the first amount of hydrogen into the exhaust. The normal hydrogen dosing may be the first dosing mode that causes the second dosing module 128, the third dosing module 157, and/or the fourth dosing module 166 to dose the first amount of hydrogen into the exhaust.

In some embodiments, the first dosing mode and/or the first engine operating mode may cause a combined first amount of hydrogen output into the exhaust. The combined first amount of hydrogen may be a predetermined amount of hydrogen to passively mitigate $NH_3$ slip by allowing the ammonia slip catalyst substrate 156 to be in a highly active state.

III. CONFIGURATION OF EXAMPLE EMBODIMENTS

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, reductant, an air-reductant mixture, hydrogen, an air-hydrogen mixture, hydrocarbon fluid, an air-hydrocarbon fluid mixture, exhaust, may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

W2 can include only W1 and W2, etc.), unless otherwise indicated.

What is claimed is:

1. A system comprising:

a hydrogen internal combustion engine configured to produce exhaust;

an aftertreatment system in exhaust receiving communication with the hydrogen internal combustion engine, the aftertreatment system comprising a catalyst member;

a first sensor coupled to the aftertreatment system upstream of the catalyst member;

a second sensor coupled to the aftertreatment system downstream of the catalyst member; and a controller configured to:

determine a first nitrogen oxide value based on first sensor data received from the first sensor, determine a second nitrogen oxide value based on second sensor data received from the second sensor, determine a nitrogen oxide reduction value corresponding to the catalyst member by comparing the first nitrogen oxide value to the second nitrogen oxide value, compare the nitrogen oxide reduction value to a threshold, upon determining that the nitrogen oxide reduction value does not exceed the threshold, cause the hydrogen internal combustion engine to operate in a first engine operating mode in which the hydrogen internal combustion engine outputs a first amount of hydrogen in the exhaust, and upon determining that the nitrogen oxide reduction value exceeds the threshold:

initiate a sulfur regeneration operation that comprises implementing an exhaust temperature command that increases a temperature of the exhaust; and during the sulfur regeneration operation, cause the hydrogen internal combustion engine to operate in a second engine operating mode in which the hydrogen internal combustion engine outputs a second amount of the hydrogen in the exhaust, the second amount greater than the first amount.

2. The system of claim 1, wherein:

when the controller causes the hydrogen internal combustion engine to operate in the second engine operating mode, the controller causes the hydrogen internal combustion engine to:

adjust a hydrogen fuel injection timing, and/or adjust a hydrogen fuel injection amount.

3. The system of claim 1, further comprising:

a heater coupled to the aftertreatment system upstream of the catalyst member, wherein the controller is further configured to cause the heater to increase a temperature of the exhaust in the aftertreatment system when the nitrogen oxide reduction value exceeds the threshold.

4. The system of claim 1, wherein:

the aftertreatment system further comprises:

a conduit, and a dosing module coupled to the conduit; and the controller is further configured to cause the dosing module to provide a target amount of reductant into the conduit when the nitrogen oxide reduction value exceeds the threshold, the target amount of the reductant based on at least one of a temperature of the exhaust or an amount of time available for providing the reductant.

5. The system of claim 1, wherein:

the aftertreatment system further comprises:

a conduit, and a dosing module; and the controller is further configured to cause the dosing module to provide a target amount of the hydrogen into the conduit when the nitrogen oxide reduction value exceeds the threshold, the target amount of the hydrogen based on at least one of a temperature of the exhaust or an amount of time available for providing the hydrogen.

6. A system comprising:

a hydrogen internal combustion engine configured to produce exhaust;

an aftertreatment system in exhaust receiving communication with the hydrogen internal combustion engine, the aftertreatment system comprising a catalyst member;

a sensor coupled to the aftertreatment system; and a controller configured to:

receive, from the sensor, sensor data corresponding to a characteristic of the aftertreatment system, determine, based on the sensor data, an ammonia value associated with the aftertreatment system, compare the ammonia value to a threshold, upon determining that the ammonia value does not exceed the threshold, cause the hydrogen internal combustion engine to operate in a first engine operating mode in which the hydrogen internal combustion engine outputs a first amount of hydrogen in the exhaust, and upon determining that the ammonia value exceeds the threshold:

initiate an ammonia slip control operation that comprises implementing an exhaust temperature command that increases a temperature of the exhaust, and during the ammonia slip control operation, cause the hydrogen internal combustion engine to operate in a second engine operating mode in which the hydrogen internal combustion engine outputs a second amount of the hydrogen in the exhaust, the second amount greater than the first amount.

7. The system of claim 6, wherein:

the controller is further configured to determine the ammonia value by estimating an amount of ammonia stored by the catalyst member based on the sensor data, the sensor data comprising a first nitrogen oxide value measured upstream of the catalyst member and a second nitrogen oxide value measured downstream of the catalyst member, and a lookup table that correlates the first and second nitrogen oxide values to the ammonia value.

8. The system of claim 6, wherein: the controller is further configured to:

receive engine data regarding an operational characteristic of the hydrogen internal combustion engine, determine that an ammonia slip event is likely to occur based on at least one of:

determining that the ammonia value exceeds the threshold, the ammonia value being based on the sensor data and the engine data, or determining that the operational characteristic of the hydrogen internal combustion engine exceeds an engine characteristic threshold, and cause the hydrogen internal combustion engine to operate in the second engine operating mode responsive to determining that the ammonia slip event is likely to occur.

9. The system of claim 6, further comprising: a dosing module;

wherein the controller is further configured to generate a dosing command when the ammonia value exceeds the threshold, the dosing command causing the dosing module to change from a first dossing mode where the first amount of the hydrogen is provided into the exhaust to a second dosing mode where the second amount of the hydrogen is provided into the exhaust, the second amount greater than the first amount.

10. A method of regenerating a catalyst member of an aftertreatment system, the method comprising:

receiving, by a controller, vehicle data comprising at least one of a sulfur amount, a time duration, a number of miles, an exhaust temperature, a catalyst activity check, or a hydrogen amount, estimating, by the controller, the sulfur amount on the catalyst member based on the vehicle data;

comparing, by the controller, the sulfur amount to a threshold;

upon determining that the sulfur amount does not exceed the threshold, causing a hydrogen internal combustion engine to operate in a first engine operating mode in which the hydrogen internal combustion engine outputs a first amount of hydrogen in an exhaust; and upon determining that the sulfur amount does exceeds the threshold:

initiating a sulfur regeneration operation that comprises implementing an exhaust temperature command that increases a temperature of the exhaust; and during the sulfur regeneration operation, causing the hydrogen internal combustion engine to operate in a second engine operating mode in which the hydrogen internal combustion engine outputs a second amount of the hydrogen, the second amount greater than the first amount.

11. The method of claim 10, further comprising:

causing, by the controller, a heater to increase a temperature of the exhaust in the aftertreatment system when the sulfur amount exceeds the threshold; wherein:

the heater is coupled to the aftertreatment system upstream of the catalyst member such that the temperature of the exhaust is greater than a temperature of the catalyst member.

12. The method of claim 11, wherein the vehicle data further comprises a first nitrogen oxide value corresponding to a first position upstream of the catalyst member and a second nitrogen oxide value corresponding to a second position downstream of the catalyst member.

13. The method of claim 12, further comprising determining, by the controller, the sulfur amount based on a difference between the first nitrogen oxide value and the second nitrogen oxide value.

14. The method of claim 11, further comprising causing, by the controller, a dosing module to provide a target amount of reductant into a conduit of the aftertreatment system when the sulfur amount exceeds the threshold, the target amount of the reductant based on at least one of a temperature of the exhaust or an amount of time available for providing the reductant.

15. The method of claim 11, further comprising causing, by the controller, a dosing module to provide a target amount of the hydrogen into a conduit of the aftertreatment system when the sulfur amount exceeds the threshold, the target amount of the hydrogen based on at least one of the exhaust temperature or an amount of time available for providing the hydrogen.

16. The method of claim 11, further comprising:

causing, by the controller, the hydrogen internal combustion engine to decrease a time period between a fuel injection and an ignition event when operating the hydrogen internal combustion engine in the second engine operating mode.

17. The method of claim 11, further comprising:

causing, by the controller, the hydrogen internal combustion engine to adjust an air-to-fuel ratio to be at or below 1 or at or above 2.5, when operating the hydrogen internal combustion engine in the second engine operating mode.

18. The system of claim 1, wherein the exhaust temperature command causes the hydrogen internal combustion engine to heat the exhaust to a predetermined target temperature.

19. The system of claim 1, wherein the exhaust temperature command causes a heater coupled to the aftertreatment system to heat the exhaust to a predetermined target temperature.

20. The system of claim 1, wherein the sulfur regeneration operation further comprises implementing a dosing amount command that causes a predefined amount of a reductant to be provided to the exhaust.

* * * * *